(12) United States Patent
Moh et al.

(10) Patent No.: US 6,455,998 B1
(45) Date of Patent: Sep. 24, 2002

(54) MULTILAYER TEMPERATURE RESISTANT COMPOSITE LABEL FOR A CATHODE RAY TUBE

(75) Inventors: Kyung H. Moh, Woodbury, MN (US); Daniel Lacave, Neus; Bernardus M. Sueoss, Moenchengladbach, both of (DE)

(73) Assignee: 3M Innovative Properties Company, ST. Paul, MN (US)

( * ) Notice: Subject to any disclaimer, the term of this patent is extended or adjusted under 35 U.S.C. 154(b) by 0 days.

(21) Appl. No.: 09/410,478

(22) Filed: Sep. 30, 1999

Related U.S. Application Data

(62) Division of application No. 09/007,531, filed on Jan. 15, 1998, now Pat. No. 6,165,594.

(51) Int. Cl.⁷ .................... H01J 31/00; C03B 29/00; B65C 3/00
(52) U.S. Cl. ................ 313/477 R; 156/DIG. 1; 156/DIG. 5; 156/89.11
(58) Field of Search ............... 313/477 R; 156/DIG. 1, 156/DIG. 5, DIG. 6, 89.11, 215

(56) References Cited

U.S. PATENT DOCUMENTS

| 4,271,210 A | 6/1981 | Yoldas .................. 427/169 |
|---|---|---|
| 4,327,283 A | 4/1982 | Heyman et al. ............ 235/487 |
| 4,514,456 A * | 4/1985 | Deal et al. ................ 428/204 |
| 4,515,867 A | 5/1985 | Bleacher et al. ............ 428/204 |
| 4,672,600 A | 6/1987 | Balston et al. .............. 369/275 |
| 4,775,786 A | 10/1988 | Yamano et al. ............. 235/490 |
| 4,861,620 A | 8/1989 | Azuma et al. ............. 427/53.1 |
| 4,888,475 A | 12/1989 | Mullenmeister ............ 235/487 |
| 4,971,858 A | 11/1990 | Yamano et al. ............. 428/323 |
| 4,983,555 A | 1/1991 | Roy et al. ...................... 264/65 |
| 5,008,151 A | 4/1991 | Tominaga et al. ........... 428/343 |
| 5,027,151 A | 6/1991 | Rayner ........................ 355/30 |
| 5,042,925 A | 8/1991 | Broer et al. .................. 359/37 |
| 5,204,163 A | 4/1993 | Nakatsuka et al. ......... 428/195 |
| 5,262,628 A | 11/1993 | Shepard et al. ............. 235/472 |

(List continued on next page.)

FOREIGN PATENT DOCUMENTS

| IE | S67365 | 3/1996 |
|---|---|---|
| JP | 03 125182 A | 5/1991 |
| JP | 04 137438 A | 5/1992 |
| JP | 07 249090 A | 11/1995 |
| WO | WO 93/07844 | 4/1993 |

OTHER PUBLICATIONS

Craig K. Harmon and Russ Adams, *Reading Between the Lines, An Introduction to Bar Code Technology*, Chapter 3 & 4 (Helmers Publishing, Inc., 1984, pp. 11–46).

*Primary Examiner*—Nimeshkumar D. Patel
*Assistant Examiner*—Thelma Sheree Clove
(74) *Attorney, Agent, or Firm*—Scott A. Bardell

(57) ABSTRACT

A composite material suitable for labeling a substrate. The composite material, which is preferably a ceramic composite, comprises a fired ceramic body and a layer thereon. The fired ceramic body includes a base layer that comprising a glassy phase and a refractory phase, the glassy phase being capable of wetting a substrate at an application temperature. There is sufficient color contrast between the top layer and the fired ceramic body such that a code pattern (e.g., a bar code) present (or formed) is optically discernible. Methods of making and using the same are also taught.

11 Claims, 3 Drawing Sheets

U.S. PATENT DOCUMENTS

| | | |
|---|---|---|
| 5,268,562 A | 12/1993 | Lazaridis .................... 235/462 |
| 5,273,798 A | 12/1993 | Miner ......................... 428/40 |
| 5,326,627 A | 7/1994 | Yazaki et al. ............... 428/216 |
| 5,362,554 A | 11/1994 | Holzer et al. .............. 428/283 |
| 5,366,682 A | 11/1994 | Morikawa et al. .......... 264/230 |
| 5,407,474 A | 4/1995 | Airey et al. .............. 106/20 C |
| 5,434,113 A | 7/1995 | Kuszyk et al. .............. 501/127 |
| 5,446,338 A | 8/1995 | Lee ........................... 313/478 |
| 5,465,780 A | 11/1995 | Muntner et al. ............ 164/516 |
| 5,484,099 A | 1/1996 | Robertson et al. .......... 228/176 |
| 5,521,371 A | 5/1996 | Hotta et al. ................. 235/487 |
| 5,521,709 A | 5/1996 | Bossen et al. ............. 358/296 |
| 5,700,623 A * | 12/1997 | Anderson et al. ........... 430/256 |
| 5,780,142 A | 7/1998 | Kume et al. ................ 428/195 |
| 6,037,041 A * | 3/2000 | Van Kooyk et al. ........ 428/195 |

* cited by examiner

MULTILAYER TEMPERATURE RESISTANT COMPOSITE LABEL FOR A CATHODE RAY TUBE

This is a divisional of application Ser. No. 09/007,531 filed Jan. 15, 1998 now U.S. Pat. No. 6,165,594.

FIELD OF THE INVENTION

The present invention relates to composite labels useable at high temperatures temperatures above about 400° C.). More particularly, the present invention relates to high temperature composite labels in which the label body includes a glassy phase and a refractory phase, and in which an optically discernible code pattern is, or can be, formed in a label top layer.

BACKGROUND OF THE INVENTION

Parts and products can be tracked during manufacturing and marketing operations in order to facilitate commodity distribution, customizing product features, process control, stock control, sales control, quality control, and the like. Such tracking requires some means for marking or labeling parts and products so that such parts and products can be readily and accurately identified during tracking. For example, according to one approach, a label bearing identification information in human readable form (e.g., alphanumeric information) or machine readable form (e.g., bar code information), or both, is attached to parts running on a production line. The label is read at one or more process stations so that specific operation steps can be carried out according to work schedules corresponding to the identification information.

In some industries, printed paper labels are used for tracking purposes. However, for other industries, (e.g., steel making industries and cathode ray tube industries) production lines operate at temperatures well above ambient conditions (e.g., above 250° C., or even above 400° C.). For example, the manufacture of a glass cathode ray tube typically involves temperatures in the range from about 400° C. to about 1000° C. Paper labels do not survive at these temperatures. Consequently, labels that can be easily attached to parts and maintain their integrity at such temperatures are needed.

Many parts have nonplanar surfaces to which a label is attached in order for such parts to be tracked. For example, a cathode ray tube includes a glass cone component and a glass faceplate component, both of which have curved, nonplanar surfaces. Consequently, not only is there a need for temperature resistant labels, but there is also a need for temperature resistant labels which are conformable to nonplanar substrates at application temperatures.

Another concern relates to the durability of labels. It is most desirable if a label is durable enough to survive the entire production process without requiring interim replacement. Unfortunately, many of the previously known labels adapted for high temperatures become disfigured and/or unreadable too easily and must be replaced several times during production in order to preserve tracking capabilities. Other labels, although durable, have a tendency to delaminate and fall off of their substrates. Consequently, labels with both excellent durability and tenacious bonding characteristics would be desirable.

As a practical matter, production yields seldom reach or are maintained at 100%. For example, parts can break, fail to meet specifications, or suffer from other defects that necessitate discarding or recycling of the parts. Recycling is often more desirable than discarding bad parts, particularly when the raw materials incorporated into the parts are relatively expensive. However, before recycled materials can be returned to the production line, contaminants are preferably removed to maintain the quality of parts formed from recycled material. Unfortunately, many of the previously known labels would contaminate the recycled supply and must be removed. Labels comprising heavy metal atoms such as Pb, Hg, As, Co and Cr(VI), whether present in pure form or in the form of oxides, are of particular concern due to the toxicity associated with such materials. Oxides of heavy metals such as Pb, Cd, Hg, and/or As are known to be incorporated into glassy phases as one approach for achieving low softening points (e.g., softening points below about 350° C.). Oxides of heavy metals such as Co and Cr are known to be used for providing black color. Consequently, articles having a label comprising one or more these heavy metals are typically recycled by delabeling and separating the less desirable heavy metals containing labels from the articles. These steps can be costly and/or extremely difficult, particularly if the bond between the article and the label is especially tenacious. In addition, heavy metals may be dispersed in air when the labels containing such metals are heated to high temperatures. Accordingly, it would be desirable to provide a label substantially free of these heavy metal atoms.

SUMMARY OF THE INVENTION

In one aspect, the present invention provides a composite material (typically a ceramic composite) suitable for labeling a substrate, comprising:
(a) a fired ceramic body comprising a base layer, the base layer including:
  (i) a first glassy phase;
  (ii) a first refractory phase (preferably a ceramic material such as particulate ceramic material) interspersed with the first glassy phase,
the first glassy phase being capable of wetting a substrate at an application temperature; and
(b) a top layer provided on the fired ceramic body,
wherein there is sufficient color contrast between the top layer and the fired ceramic body such that a code pattern (preferably formed by selectively removing the top layer from portions of the composite layer) is optically discernible. Optionally, a label according to the present invention may further comprise a translucent (including transparent or clear) cover (e.g., a protective layer or a coating) over the top layer. A protective layer (e.g., a glass layer) is sufficiently translucent to allow a bar code reader, human eye, or other detector means to view or read the underlying code pattern. Optionally, the translucent layer(s) is a fugitive material.

Embodiments of labels according to the present invention are capable of retaining not only their dimensional integrity, but also the integrity of information incorporated into the labels, especially when the label is exposed to high temperatures (e.g., temperatures above 250° C., preferably 400° C. to 1000° C.). In another aspect, labels according to the present invention can be conveniently applied to a wide range of substrates, including metal, glass, ceramics, and the like, which are intended to be used at relatively high temperatures.

Labels according to the present invention comprise a top layer of one color overlying a layer of a contrasting color. When portions of the top layer are selectively removed to expose portions of the underlying layer, the color contrast between layers allows the resultant pattern formed from the top layer to be optically discernible. This allows information to be incorporated into the label by selectively patterning or removing the top layer to form one or more symbols of a code pattern either as a negative or a positive image, as desired. Such a code pattern, in turn, allows a labeled substrate to be easily identified and tracked during production. The code pattern(s) can be formed in the label either before and/or after the label is attached to a corresponding substrate. Information can be incorporated into the label one or more times during the service life of the label as well. This is particularly advantageous for production operations in which updating label information during the course of production is desired.

The code pattern incorporated into the label may be human readable, machine readable, combinations of these, and the like. In preferred embodiments, the code pattern includes human readable alphanumeric characters, machine readable bar code characters, or combinations thereof Bar code patterns, in particular, can be easily and rapidly formed in labels of the present invention using, for example, well known laser ablating techniques.

Because of the color contrast and multilayer construction of labels according to the present invention, code patterns can be formed by abrasion, etching or abrading techniques in which substantially only portions of the top layer are removed. In other words, material can be selectively removed from the label only to a depth substantially corresponding to the thickness of the top layer. Very little if any of the underlying label layers need be subjected to such removal, and the substrate itself remains unaltered. Advantageously, therefore, the underlying layers of the label can further serve as a protective barrier between the patterning applied to the top layer and the substrate below. In this way, the substrate can be protected from damage that might otherwise occur if such patterning techniques were to be applied directly to the substrate itself In another aspect, the code pattern can be formed directly, for example, by depositing the pattern to the top layer using a surface printing technique such as ink jet printer with a ceramic oxide containing ink or depositing the composition through a mask.

Labels according to the present invention include a structural base layer incorporating both a glassy phase and a refractory phase. This composite structure makes it easy to firmly attach the labels to a wide variety of substrates at an application temperature at which the glassy phase liquifies and wets the substrate surface. Because the glassy phase itself bonds to the substrate, no other adhesives are required to achieve label attachment. When the glassy phase is liquified at the application temperature, the refractory phase structurally and dimensionally supports the base layer. Simultaneously, the base layer can be pliable due to the presence of the melted glassy phase, thereby allowing the label to conform to nonplanar substrates, while the presence of the reinforcing refractory phase allows the label to retain its dimensional and structural integrity as the label is flexed, bent, or otherwise shaped to conform to such a substrate.

In applications in which the substrate is formed from a glass and/or a crystalline ceramic, the coefficient of thermal expansion of a label of the present invention can generally be matched as closely to the coefficient of thermal expansion of the substrate as desired. Matching the coefficients of thermal expansion of the substrate and label offers numerous advantages. For example, such matching enhances the strength of the bond between the label base layer and the substrate. As a further advantage, such matching minimizes thermally induced stresses between the substrate and label as temperatures change. If the coefficients of thermal expansion are not matched well, thermal induced stresses can damage the label and/or the substrate.

In preferred embodiments, labels according to the present invention preferably include substantially no heavy metal atoms selected from Pb, Cd, As, Hg, Co, and Cr(VI). Such heavy metal atoms generally pose environmental and/or health hazard so that avoiding the use of such materials is highly desirable. Providing labels that are free of these kinds of heavy metal atoms also facilitates recycling, because both the label and the substrate can be processed for recycling together without having to remove the label. If the label were to incorporate these kinds of heavy metal atoms, the label might be an undesirable contaminant that would have to be removed from the substrate in the event recycling is desired. This would involve extra expense and processing steps. Avoiding such heavy metal atoms as label constituents is particularly advantageous for industrial applications such as the manufacture of cathode ray tubes, where breakage is known to occur and recycling is regularly practiced.

Another aspect of the present invention relates to a labeled cathode ray tube, or components thereof (e.g., faceplates and funnels). The labeled cathode ray tube comprises a cathode ray tube glass surface and at least one fired composite label according to the present invention attached to the cathode ray tube glass surface.

In yet another aspect, the present invention provides a method of applying a label (including a blank label (i.e., a label without the code pattern)) according to the present invention to a substrate, the method comprising the steps of, (a) providing and/or heating a substrate (e.g., a ceramic material) at and/or to an application temperature; and (b) attaching the label to the substrate such that the first glassy phase of the label bonds to the substrate.

Optionally, the label is heated to and/or is at the application temperature rather than the substrate, or both the substrate and the label are heated to and/or are at the application temperature.

In this application:

"Softening point" refers to the temperature at which the viscous flow of a glassy composition counteracts thermal expansion as determined according to ASTM test method E 1545-95A (December, 1995) entitled "Standard Test Method for Assignment of Glass Transition Temperature by Thermomechanical Analysis," the disclosure of which is incorporated herein by reference. Such a temperature generally corresponds to the maximum point on a thermal expansion curve. In this method, the softening point is referred to as the "dilatometric" softening point.

"Ceramic" refers to an inorganic, nonmetallic material, such as metal oxides, metal nitrides, and metal oxynitrides, preferably consolidated by the action of heat.

"Fired" refers to densification or consolidation by action of heat.

"Refractory" refers to a material that maintains its structural integrity at temperatures at least up to about 1000° C.

"Glassy" refers to an amorphous inorganic oxide material having a softening point above which the material melts or softens. Amorphous materials typically have a diffuse x-ray diffraction pattern without definite lines that might otherwise indicate the presence of a crystalline phase.

BRIEF DESCRIPTION OF THE DRAWING

The above mentioned and other advantages of the present invention, and the manner of attaining them, will become more apparent and the invention itself will be better understood by reference to the following description of the embodiments of the invention taken in conjunction with the accompanying drawings, wherein.

DETAILED DESCRIPTION

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

Figure 1:
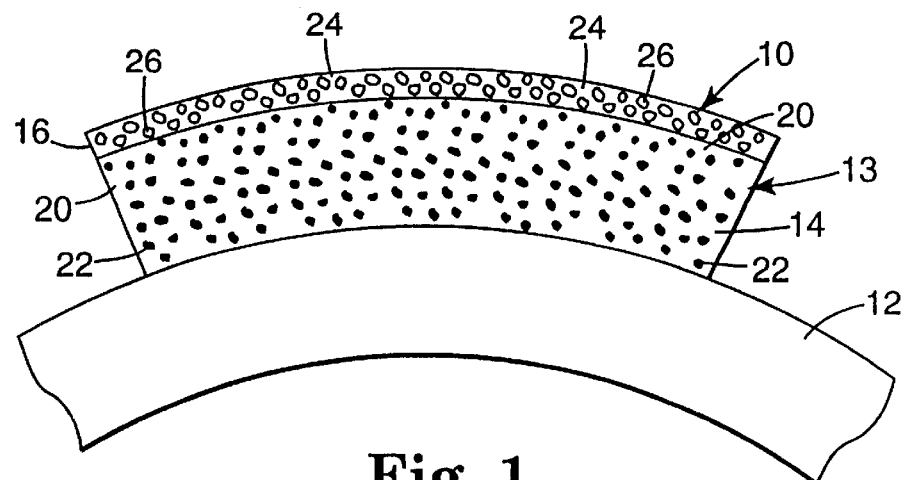
FIG. 1 is a schematic cross-sectional view of a label according to the present invention attached to a substrate, wherein the label has a dark colored base layer and a light colored top layer.

FIG. 1 shows one preferred embodiment of a fired composite ceramic label according to the present invention. Fired composite ceramic label according to the present invention 10 is attached to substrate 12. The structures of label 10 and substrate 12 have not been drawn to scale, but rather have been represented schematically for purposes of illustration. Substrate 12 may be any of a wide variety of substrates for which labeling with a ceramic-based label is desired. Label 10 is particularly useful, however, in high temperature industrial labeling applications involving elevated temperatures of at least 250° C., preferably at least 400° C., more preferably in the range from 400° C. to 1800° C., and even more preferably in the range from 400° C. to about 1000° C., in which substrate 12 is made of a metal, a metal alloy, a glass, a crystalline ceramic, other refractory materials, combinations of these, and the like. Representative examples of just a few of the many kinds of substrates that advantageously can be labeled in accordance with the principles of the present invention include liquid crystal displays (LCD's), flat glass, curved glass, ceramic whiteware, wine bottles, nuclear waste tanks, glass surfaces of cathode ray tube components (e.g., cones and faceplates), motor vehicle components, aircraft engine components, rocketry components, and the like. As shown, substrate 12 is curved, although this is not required. Label 10 can be attached to other kinds of substrates which are flat, cone-shaped, undulating, irregularly textured, otherwise nonplanar, or have any other desired configuration.

Optionally, a label according to the present invention may include an indicator element or material, or markings, for example, on the surface of the label or within the label composition, enabling a user to select a particular label or label type for a specific application (e.g., selecting the correct label type for a specific glass substrate). For example, the base layer, top layer, and/or other layer(s) may have colors or a certain color combination to allow for easy differentiation between labels designed for different application temperatures.

Advantageously, label 10 includes a composite composition that allows label 10 to be sufficiently pliable at a desired, elevated application temperature so as to be conformably attachable to nonplanar substrate surfaces while still maintaining structural and dimensional integrity. Some preferred embodiments of the present invention are conformable to surfaces with compound curvature. The term "compound curvature" refers to a surface which is curved about more than one axis. For example, the surfaces of a sphere or a saddle are examples of surfaces with a compound curvature. Typically, a surface with compound curvatue cannot be formed from a flat sheet without stretching at least some region of the sheet. In contrast, a cylindrical surface is a surface with simple curvature about one axis.

Label 10, as illustrated, has a two layer construction including ceramic body 13 and top layer 16 provided on ceramic body 13. Ceramic body 13 is in the form of base layer 14. Although only base layer 14 is shown as an element of fired ceramic body 13 in this embodiment, ceramic body 13 may also be formed with multiple layers. One such multiple layer, alternative embodiment will be described in more detail below in connection with FIG. 6.

Still referring to FIG. 1, base layer 14 has fired, composite ceramic composition incorporating glassy phase 20. Base layer 14 also incorporates a refractory phase in the form of plurality of refractory particles 22 interspersed in glassy phase 20. Glassy phase 20 preferably has softening point characteristics effective to provide label 10 with desired physical and mechanical properties for the intended use. For example, glassy phase 20 preferably has a softening point so that glassy phase 20 is capable of wetting and thereafter fuseably bonding to substrate 12 at the desired application temperature. If the softening point is too high relative to the application temperature, it may be difficult to bond label 10 to substrate 12. If the softening point is too low relative to the desired application temperature, glassy phase 20 may flow too much during application to substrate 12, causing ceramic body 13 to lose its dimensional and/or structural integrity.

Accordingly, given a particular application temperature at which it is desired to attach label 10 to substrate 12, it is preferred that the application temperature is from about 100° C. to about 300° C. greater than the softening point of glassy phase 20. To illustrate this relationship, the following table shows suitable softening point ranges for glassy phase 20 at application temperatures of 550° C., 750° C., and 800° C., respectively:

| Application Temperature | Corresponding Softening Point Range of Glassy Phase 20 |
|---|---|
| 550° C. | 250° C. to 450° C. |
| 750° C. | 450° C. to 650° C. |
| 800° C. | 500° C. to 700° C. |

Given a desired application temperature, one skilled in the art would be able to provide a glassy phase having the desired softening point characteristics.

Similar to base layer 14, top layer 16 also preferably has fired, composite ceramic composition incorporating a glassy phase 24 and refractory phase in the form of a plurality of refractory particles 26 interspersed in glassy phase 24. Glassy phase 24 desirably has a softening point effective to allow top layer 16 to be sufficiently conformable to substrate 12 along with base layer 14 without fracturing and without experiencing undesirable levels of flow at the desired application temperature of label 10. In preferred embodiments, the softening point of glassy phase 24 preferably is greater than the softening point of glassy phase 20. More preferably, the softening point of glassy phase 24 is greater than the softening point of glassy phase 20, and the difference between such softening points is preferably in the range from 5° C. to 50° C., more preferably 5° C. to 20° C.

The color contrast, physical, mechanical, and thermal properties of base layer 14 and/or top layer 16 can be tailored, for example, through appropriate selection of the amount and kind of refractory particles 22 and/or 26 incorporated into either layer. For example, refractory particles 22 and 26 may be selected to provide base layer 14 and top layer 16 with first and second colors, respectively, between which there is sufficient contrast such that a code pattern (not shown in FIG. 1) formed from top layer 16 is optically discernible when the underlying base layer 14 is exposed by removing portions of the top layer 16. "Optically discernible" means that such a code pattern is human and/or machine readable using optical techniques. Representative examples of such optical techniques includes viewing and/or scanning using infrared (IR) light, visible light, ultraviolet (UV) light, or the like. Labels that are intended to be legible in the IR and/or UV ranges may not be discernible in the visible range. As an option, the light source may be collimated or uncollimated. In preferred embodiments, one of layers 14 or 16 is black, and the other layer is white.

In the embodiment shown in FIG. 1, base layer 14 is relatively dark (e.g., black) and top layer 16 is relatively light (e.g., white). In order to provide base layer 14 with a relatively dark color, relatively dark refractory particles 22 can be incorporated into base layer 14. In order to provide top layer 16 with a relatively light color, relatively light refractory particles 26 can be incorporated into top layer 16. With this approach, selective removal of portions of relatively light top layer 16 will expose the relatively dark, underlying base layer 14. Portions of top layer 16 can be removed to form either a negative or positive code pattern. As used herein, a "negative" code pattern is a pattern in which the portions of the top layer corresponding to the code pattern characters themselves are removed from the top layer to form the code pattern. A "positive" code pattern is a pattern in which portions of the top layer around the code characters are removed so that the remaining portions of the top layer form the code pattern. As an option, a code pattern formed from the top layer may include one or more negative code pattern portions, one or more positive code pattern portions, or a combination of one or more positive code patterns and one or more negative code patterns.

Figure 2A:
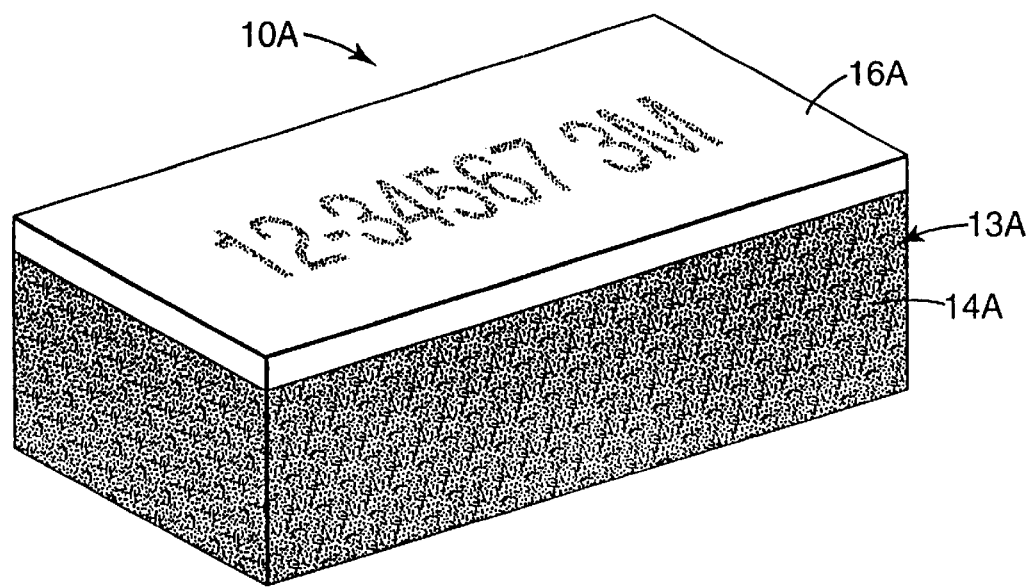
FIG. 2A is a perspective view of the label of FIG. 1, wherein a negative code pattern has been formed by removing portions of the top layer.

FIG. 2A shows label according to the present invention 10A identical to label 10 of FIG. 1, except that portions of top layer 16A have been removed to form negative alphanumeric code pattern "12-34567". In this embodiment, only portions of top layer 16A corresponding to the alphanumeric characters themselves have been removed to expose the relatively dark, underlying base layer 14A of ceramic body 13A.

Figure 2B:
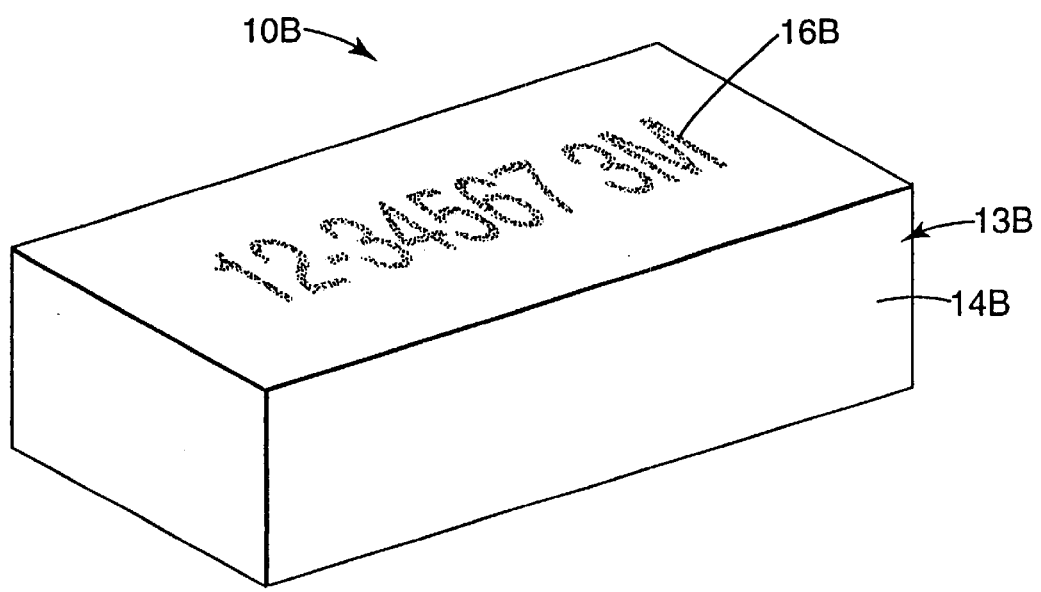
FIG. 2B is a perspective view of the label of FIG. 1, wherein a positive code pattern has been formed by removing portions of the top layer.

On the other hand, FIG. 2B shows label according to the present invention 10B identical to label 10 of FIG. 1, except that portions of relatively dark top layer 16B have been removed to form positive alphanumeric code pattern "12-34567". Base layer 14B of ceramic body 13B is relatively light. In this case, all portions of top layer 16B except the portions corresponding to the characters themselves have been removed. Because so much less material needs to be removed from top layer 16B to form the negative code pattern of FIG. 2A than the positive code pattern of FIG. 2B, label 10A is a preferred configuration to be used when code patterns having dark code characters are desired. In some applications, recycling considerations may be more important than the convenience of feature formation. For example, removing almost all of a highly colored layer to leave only a small amount of colored material in a positive image may be more desired in recycling schemes for which the colorant would be a contaminant.

When forming a code pattern such as the code patterns shown in FIGS. 2A and 2B, the code pattern can be formed in top layer 16 using any technique suitable for removing portions of top layer 16, including abrasion, ablating or etching techniques. In the practice of the present invention, the use of laser ablating techniques is presently preferred for forming code patterns in top layer 16. Laser ablating is well-known, economical, fast, and provides patterns with sharp, precise features. A code pattern can be formed in top layer 16 before and/or after label 10 is attached to substrate 12, as desired.

Alternatively, rather than using abrading, ablating, or etching techniques to pattern layer 16, the code pattern can be formed directly by depositing the pattern ed form of top layer 16 using a suitable printing technique such as ink jet printing with a ceramic oxide containing ink or depositing the composition through a mask. Ink jet printing techniques are described, for example, in U.S. Pat. No. 5,407,474 (Airey et al.), the disclosure of which is incorporated herein by reference.

The code pattern can be formed in the top layer, for example, by the above techniques at various temperatures (e.g., ambient and/or high temperatures (e.g., temperatures above 250° C., preferably 400° C. to 1000° C.)).

In another aspect, some techniques, such as laser ablating, may be used to remove various thicknesses of the top layer of the label, to allow, for example, different levels of contrast on the same label. For example, for a top layer having some translucency, the degree of contrast in a code pattern can be adjusted or varied by varying the thickness of the top layer removed. The greatest contrast being obtained for a given label when the total thickness of the top layer is removed (i.e., when the underlying layer is exposed).

Figure 3:
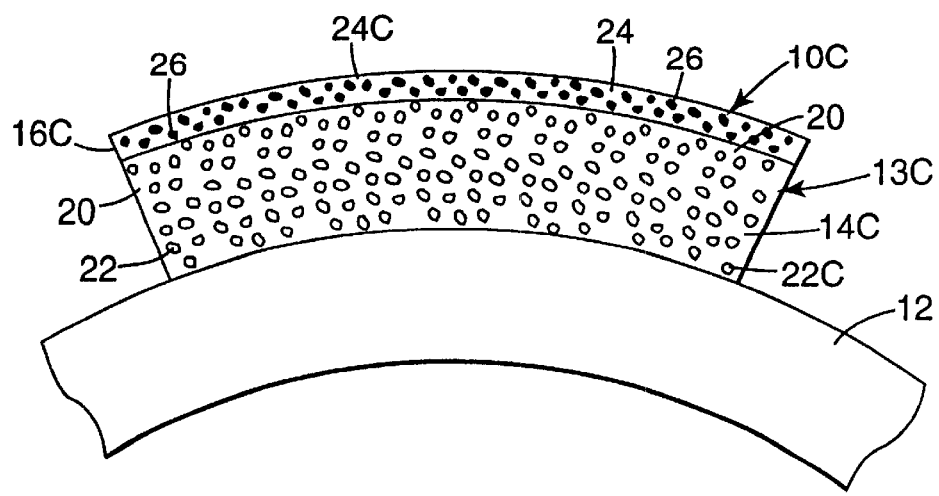
FIG. 3 is a schematic cross-sectional view of another label according to the present invention attached to a substrate, wherein the label has a light colored base layer and a dark colored top layer.

FIG. 3 shows an alternative embodiment of label according to the present invention 10C which is the same as label 10 of FIG. 1, except that base layer 14C has a relatively light color provided by relatively light colored refractory particles 22C, and top layer 16C has a relatively dark color provided by relatively dark refractory particles 24C.

In order to provide a layer with a dark color, the use of substantially black refractory particles is preferred. Representative suitable black refractory particles may be selected, for example, from particles of silicon carbide, titanium carbide, zirconium carbide, graphite, combinations of these, and the like. The dark color may also be provided by inclusion of dark-colored, nonrefractory particles such as carbon black, $MnO_2$, combinations of these, and the like. In order to provide a layer with a light color, the use of substantially white refractory particles is preferred. Representative examples of suitable white refractory particles may be selected, for example, from alumina, zirconia, zircon, mullite, titania, combinations of these, and the like. Other materials for the (light-colored or dark-colored) refractory particles may include those made of metal (e.g., platinum, rhodium, and the like) and/or a cermets.

Referring again primarily to FIG. 1, refractory particles 22 also contribute to preferred dimensional and structural integrity characteristics of base layer 14. For example, if too few refractory particles 22 are included in base layer 14, glassy phase 20 may flow too much at the application temperature. Advantageously, a sufficient amount of refractory particles 22 are incorporated into base layer 14 to block such undesirable flow of glassy phase 20, thereby helping to maintain the structural and dimensional integrity of base layer 14. Additionally, if too few refractory particles 22 are included in base layer, the resultant base layer 14 may be too brittle, and/or base layer 14 may be too sticky at the application temperature for convenient handling prior to attachment of base layer 14 to substrate 12. On the other hand, if base layer 14 incorporates too many refractory particles 22, base layer 14 may not allow sufficient flow of the glassy phase to promote good bonding, or base layer 14 may be so rigid as to lack a desired amount of pliable conformability. Generally, balancing these concerns, a preferred base layer 14 of the present invention incorporates a sufficient amount of refractory particles 22 such that base layer 16 is pliably conformable at the desired application temperature if necessary to conform to a surface of the substrate (e.g., a flat label needs to be pliably conformable at the desired application temperature to conform to a substrate having a curved surface). More preferably, base layer 14 incorporates enough refractory particles 22 such that base layer 14 includes 10 to 60, preferably 30 to 50, volume percent of glassy phase 20 and 40 to 90, preferably 50 to 70, volume percent of refractory particles 22.

Because top layer 16 is fully supported by the dimensionally stable, yet conformable base layer 14, refractory particles 26 need not serve a primary structural and dimensional function as do refractory particles 22 in base layer 14. Refractory particles 26, however, do provide a convenient means for coloring top layer 16 to ensure that a code pattern formed from top layer 16 is optically discernible from base layer 14. Accordingly, refractory particles 26 may be incorporated into top layer 16 in lesser amounts so long as enough particles 26 are used to provide top layer 16 with desirable color contrast characteristics. To this end, preferred top layers 16 of the present invention incorporate 5 to 50 parts by weight, more preferably 10 to 40 parts by weight of refractory particles 26 per 100 parts by weight of glassy phase 24.

In addition to contributing to color contrast, mechanical strength, dimensional and structural stability, and conformability, refractory particles 22 and 26 provide numerous other benefits as well. For example, using appropriate amounts of refractory particles 22 or 26, as the case may be, also helps provide each of base layer 14 and top layer 16, respectively, with a desired coefficient of thermal expansion. For example, it is preferred that base layer 14, top layer 16, and substrate 12 have similar coefficients of thermal expansion to minimize thermal stresses when substrate 12 bearing label 10 is subjected to temperature changes. This is particularly beneficial when hot substrates are cooled to room temperature from temperatures above 400° C. If the coefficients of thermal expansion of the layers 14 and 16 and substrate 12 are too far apart, then thermal stresses could cause label 10 and/or substrate 12 to warp, crack, or otherwise suffer damage.

Accordingly, it is generally desirable if the ratio of the coefficients of thermal expansion of each of base layer 14 and top layer 16 to that of substrate 12 be in the range of 0.8 to 1.2, preferably 0.9 to 1.1 over a temperature range extending from about room temperature to about the desired application temperature. In the practice of the present invention, the coefficient of thermal expansion of a material is measured by ASTM E831, "Standard Test Method for Linear Thermal Expansion of Solid Materials by Thermomechanical Analysis" (September 1993), the disclosure of which is incorporated herein by reference. As an example, cathode ray tube glass typically has a coefficient of thermal expansion in the range from $8\times10^{-6}/°$ C. to $12\times10^{-6}/°$ C. over a temperature range extending from 25° C. to 300° C. For cathode ray tube glass having a coefficient of thermal expansion of about $8\times10^{-6}/°$ C., it is preferred that each of base layer 14 and top layer 16 independently have a coefficient of thermal expansion in the range from $6.4\times10^{-6}/°$ C. to about $9.6\times10^{-6}/°$ C. Similarly, for cathode ray tube glass having a coefficient of thermal expansion of about $12\times10^{-6}/°$ C., it is preferred that each of base layer 14 and top layer 16 independently have a coefficient of thermal expansion in the range from $9.6\times10^{-6}/°$ C. to $14\times10^{-6}/°$ C.

In addition, refractory particles 22 and 26 may help minimize carbon trapping during firing, which can contribute to an off white color and reduce the contrast ratio of the formed image. In white-colored layers, refractory particles 22 and 26 with high refractive index may be used to enhance the white color.

Refractory particles 22 and 26 may each be provided with a wide range of particle sizes and shapes with beneficial results. Excessive porosity is generally undesirable, because layers with too much porosity tend to be mechanically weak. On the other hand, if the particles are too big, then the resultant layer may be too rough and/or mechanically weak. Generally, in preferred embodiments according to the invention, refractory particles 22 and 26 independently have an average particle size in the range from 2 micrometers to about 10 micrometers. In terms of shape, refractory particles 22 and/or 26 independently may be spherical, ellipsoid, platelet-shaped, acicular, or the like. However, acicular-shaped particles typically provide layers with the better impact resistance as compared to layers incorporating particles of other shapes.

Typically, refractory particles 22 and/or 26 have a normal particle size distribution. As an option, however, refractory particles 22 and/or 26 having bimodal or other multimodal size distributions could be used, if desired. For example, the appropriate selection of a combination of two or more particle size distributions may help refractory particles 22 and/or 26 to further viscosify glassy phases 20 and/or 24 to prevent excessive flow at the application temperature as compared to particles having only a normal size distribution. Viscosification may also help glassy phase 20 more effectively fiseably bond to substrate 12. In combination with blockage of glassy flow during firing and/or during application, such viscosification, or thickening, of glassy phase 20 may further help maintain the structural and dimensional integrity of base layer 14 without significantly limiting conformability. Accordingly, in applications in which it is desirable to further viscosity glassy phase 20 and/or 24, at least a portion, preferably 5 to 10 weight percent, of refractory particles 22 and/or 26 may include an amount of finely divided refractory particles (i.e., refractory particles have an average particle size of less than 1 micrometer, preferably 0.5 to 1 micrometer) effective to substantially prevent undesired flow of glassy phase 20 and/or 24.

In the preferred embodiments, the refractory particles of the base layer provide a loose framework which supports and determines the shape of the base layer. The glass phase fills the void volume within the refractory framework. If the volume of the glass phase is significantly lower than the available void volume, the glass may not flow sufficiently well from the composite to wet the substrate at the application temperature. If the volume of the glass phase is significantly greater than the available void volume, the base layer may not retain the desired degree of dimensional integrity during the application process. The available void volume is expected to depend on the prefiring size distribution associated with the refractory particles and the shape or shapes associated with the refractory particles. For example, uniform, highly acicular needles are expected to pack less efficiently than a broadly distributed population of spherical particles. Useful ranges of the ratio of glass phase volume to refractory phase volume within the base layer are from about 1.2:1 to about 3.0:1. The weight percentage of refractory particles in a label layer after firing is in the range of 4.7% to 33.3% for most label applications.

Particle size as used herein refers to the longest dimension of a particle, and can be measured by any convenient technique. For particles up to about 100 micrometers in size, a "Coulter Counter, Model TA3" particle size analyzer available from Coulter Corp., Hialeah, Fla., can be used.

Glassy phases 20 and 24, or any glass phase to be used in labels according to the present invention, may be independently formed from a wide variety of glassy materials, or combination of glassy materials. Most typically, glassy phases 20 and 24 each independently comprise one or more metal oxides of Si, Al, Fe, K, Mg, Ti, P, Ca, Na, Mn, B, Ge, Zn, Sn, Ba, Bi, Cu, Li, combinations thereof, and the like, according to formulaic characterization in which glass composition is expressed on a theoretical oxide basis (e.g., in the case of Si as $SiO_2$). Incorporating various amounts of oxides of the Sn, Zn, and Li into the glassy phases is particularly useful for controlling the respective softening points. For example, using greater amounts of SnO, graphite, and/or $Li_2O$ tends to lower the softening point (graphite also tends to lower the softening point, but is a refractory material), whereas using greater amounts of SnO tends to increase the softening point. Incorporating $P_2O_5$ generally tends to mechanically strengthen a glassy phase.

It is particularly preferred that glassy phases 20 and 24 be substantially free of any of the following heavy metal atoms: Pb, Cd, As, Hg, Co, and Cr(VI). By using oxides of SnO and $Li_2O$, the present invention advantageously achieves low softening points without relying upon oxides of the less desirable heavy metals. Also in the past, oxides of heavy metals such as Co and Cr were used for providing black color. Embodiments of the present invention avoid these heavy metals by using other black-colored particles as a substitute. Graphite, for example, not only tends to lower the softening point but is also an excellent dark colorant.

As concrete examples, glassy phase 20 preferably comprises, on a theoretical oxide basis, in the range from about 20 to about 40 percent by weight SnO, in the range from about 20 to about 35 percent by weight SnO, and in the range from about 35 to about 45 percent by weight $P_2O_5$, based on the total weight of glassy phase 20. Glassy phase 24 preferably comprises, on a theoretical oxide basis, in the range from about 20 to about 37 percent by weight SnO, in the range from about 24 to about 35 percent by weight SnO, and in the range from about 39 to about 44 percent by weight $P_2O_5$, based on the total weight of glassy phase 24. Either of these preferred glassy phases 20 and/or 24 may also include up to about 1 percent by weight of $Li_2O$.

As an option, base layer 14 and/or top layer 16 may further incorporate glass and/or refractory fibers in order, for example, to increase toughness. Glass and/or refractory fibers suitable for this purpose may have a wide range of particle sizes. Generally, fibers having an average diameter in the range 10 to 20 micrometers, preferably 13 to 16 micrometers, and an aspect ratio (i.e., length to diameter) of 3 to 20 would be suitable. A specific example of one suitable glass fiber having an average diameter of 13.3 micrometers and an aspect ratio of about 10 is available under the trade designation "739 EC1/32" from Owens Coring Co., of Anderson, S.C.

Generally, a sufficient amount of fibers may be added to improve toughness. Typically, using 20 to 30 parts by weight of glass fibers per 100 parts by weight of glassy phase would be suitable. Typically, the glass fiber is a substitution for a corresponding amount of glass frit and refractory materials, the glass fiber usually having a softening point significantly higher than that of glass frit.

In preferred embodiments of the present invention, color contrast characteristics are provided by incorporating appropriately colored refractory particles into each of base layer 14 and top layer 16. However, a suitable degree of color contrast can be provided by other approaches. For example, one or both of layers 14 and 16 may incorporate particles that fluoresce in response to the light emitted from a bar code scanning device so that the optical discernibility between layers 14 and 16 is thereby enhanced. In such embodiments, the code pattern may or may not be optically discernible in the absence of the scanner's interrogation beam, but becomes optically discernible to the scanner when the particles fluoresce. This approach relies upon the appreciation that the label need only display the requisite color contrast at the time of scanning.

Representative examples of fluorescent particles responsive to the scanning light of a bar code scanner include particles that fluoresce in response to the light, radiation, or other stimulus emitted from the scanning device so that they are optical discernible. Representative examples include UV excited fluorescent lamp phosphors or visible light responsive phosphorescent materials such as alkaline earth halophosphates (e.g., obtained from Sylvania under the trade designation "COOL WHITE CA HALOPHOSPHATE NO. 4459"), zinc orthosilicates, and sulphides such as ZnS and CaS. Rare earth doped yttria, or yttrium, gallium, and aluminum garnets and other oxides or oxysulphides are additional phosphor materials. Typically, these particles have a particle size in the range from 1 to 100 micrometers, often 2–20 micrometers. A sufficient amount of such particles is included in base layer 14 and/or top layer 16 so that the code pattern is optically discernible at the time that the code pattern is "read" by a suitable reading device. General, using 5 to 500 parts by weight of phosphor particles based on 100 parts by weight of the corresponding glassy phase would be suitable.

Label 10 according to the present invention may be provided with an overall thickness within a wide range depending upon factors such as the nature of substrate 12, the type of code pattern used on the label, the purpose of the label, and the like. Practically, the label should be thick enough to withstand the rigors of its intended use while still being pliably conformable to nonplanar substrates, but not so thick that the label unduly gets in the way when handling the substrate or is otherwise inconvenient. Further, extra thickness may offer little added benefit in terms of mechanical strength while adding unnecessary bulk, cost, or the like. Generally, it has been found that providing the label with an overall thickness in the general range from 100 micrometers to about 2 mm, preferably 400 to 800 micrometers, is suitable for many applications.

The embodiments of the present invention shown in FIGS. 1 and 3 are particularly suitable for forming labels in which a code pattern is formed in top layer 16 using laser ablating techniques. Accordingly, top layer 16 of such embodiments is desirably provided with a thickness such that laser ablating removes a sufficient amount of top layer 16 to expose the color contrast of the underlying layer, thereby allowing the resultant code pattern to be optically discernible. If top layer 16 is too thick, the laser may not penetrate far enough into top layer 16 so as to provide an effective code pattern. If top layer 16 is too thin, the laser may penetrate not only through top layer 16, but may also too far into the underlying structure so as to affect the structural integrity of label 10. Substrate 12 could also be damaged as well.

Balancing these concerns, an appropriate thickness for top layer 16 can be determined empirically by measuring the depth to which the etching laser penetrates into label 10. The thickness of top layer 16 may then be selected to substantially correspond to that depth. Preferably, however, the thickness of top layer 16 is slightly less than the depth of laser penetration into label 10 so that the laser penetrates a little ways into the underlying ceramic body 13. This fully exposes contrasting portions of the underlying body 13 to maximize the optical discernibility of the code pattern. Generally, penetration into the underlying body 13 may be up to 10%, preferably up to 5%, more preferably up to about 1% of the total thickness of underlying body 13. Typically, providing top layer 16 with a thickness in the range from 5 micrometers to about 80 micrometers would be suitable in the practice of the present invention.

Figure 4:
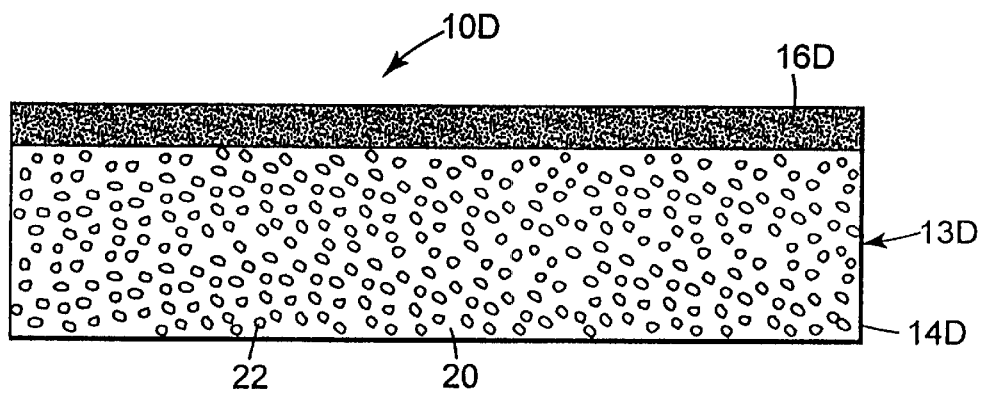
FIG. 4 is a schematic cross-sectional view of another label according to the invention wherein the base layer is light colored and the top layer is a metal or metal alloy.
Figure 5:
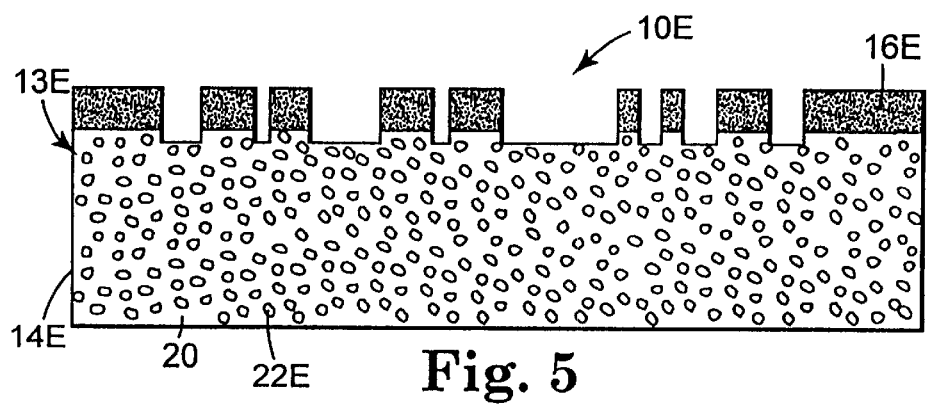
FIG. 5 is a schematic cross-sectional view of the label of FIG. 4, wherein a code pattern is incorporated into the top layer.

FIGS. 4 and 5 show alternative embodiments of the present invention which are identical to the embodiments of FIGS. 2B and 3, respectively, except for two differences. Firstly, top layers 16D and 16E of FIGS. 4 and 5, respectively, each comprises a refractory phase that has been replaced by a metal, an intermetallic material, and/or a metal alloy, that is preferably a noble metal such as gold, silver, platinum, and the like. As used hereinafter, the term "metal" with respect to top layer 16D and 16E will refer to a metal, an intermetallic material, and/or a metal alloy. In FIG. 4, top layer 16D may be formed upon composite ceramic base layer 14D using any suitable technique for depositing metal-containing coatings. Representative techniques for forming such a metal coating include sputtering, chemical vapor deposition, screen printing, electroless plating, chemical reduction, photo reduction, and the like. In FIG. 5, top layer 16E is selectively patterned to incorporate a code pattern. As is the case with the embodiment shown in FIGS. 2A and 2B above, the code pattern of metal top layer 16E in FIG. 5 may be formed by abrading, ablating, or otherwise etching top layer 16E. Alternatively, rather than using abrading, ablating, or etching techniques to pattern metal top layer 16E of FIG. 5, the patterned form of top layer 16E shown in FIG. 5 can be formed directly using a suitable printing technique such as an ink jet printing with a metal containing ink or a, metal deposition through a mask (see, e.g., U.S. Pat. No. 5,407,474 referred to above).

As a second difference, because top layers 16D and 16E of FIGS. 4 and 5, respectively, each are formed from a metal, top layer 16D and 16E will generally tend to have a relatively dark color as a natural characteristic. Accordingly, base layer 14D and 14E desirably incorporates relatively light colored refractory particles 32D and 32E so that the code pattern formed in top layer 16D and 16E is optically discernible from base layer 14D and 14E. When top layers 16D and 16E of FIGS. 4 and 5, respectively, each are formed from a metal, it optionally may also be possible to discern the encoded information by detecting variations in electrical or thermal conductivity across the face of the patterned label.

In embodiments of the present invention incorporating base layer glassy phase 20 having a relatively low softening point (e.g., a softening point less than about 350° C.), firing of such embodiments when green can result in organic constituents becoming trapped in glassy phase 20. Such entrapment can cause base layer 14 to be black in color. Accordingly, as one option for such embodiments, it is preferred to use such black base layers 14 in combination with a contrasting, (e.g., white), top layer 14. This ensures that label 10 will comprise two layers of contrasting color so that an optically discernible code pattern can be formed.

Figure 6:
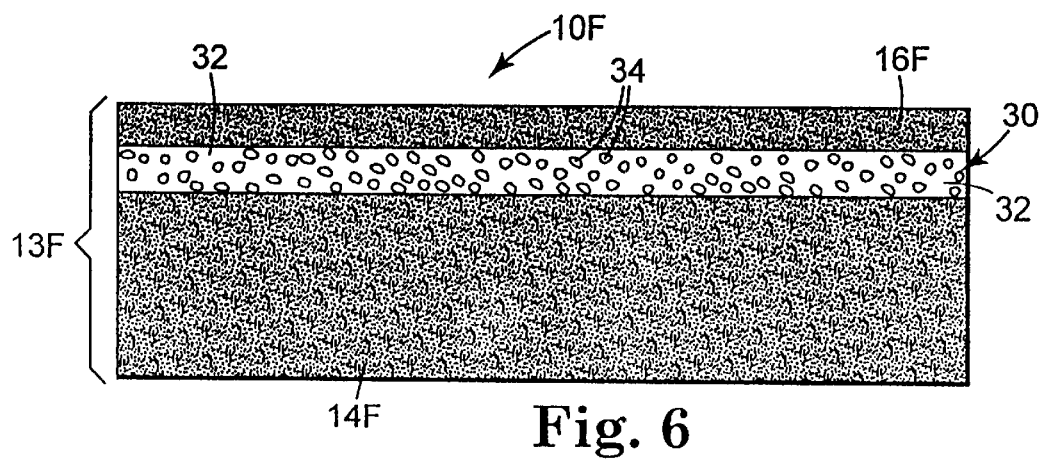
FIG. 6 is a schematic cross-sectional view of another label according to the present invention, wherein the label body incorporates an intermediate layer interposed between the base layer and the top layer.

In some applications, however, the use of black colored top layer 16 is still desired, notwithstanding the black color of base layer 14. Unfortunately, such a black-on-black structure is not an optimum configuration for labeling purposes due to the lack of contrast between the two layers. The embodiment of the present invention shown in FIG. 6 provides a solution to this problem. There, label 10F is identical to label 10C of FIG. 3 with two exceptions. First, base layer 14F further incorporates organic constituents helping to make base layer 14F black in color. Secondly, body 13F of label 10F further incorporates relatively light colored intermediate layer 30 interposed between dark base layer 14F and dark top layer 16F. Intermediate layer 30 comprises a glassy phase 32 and a refractory phase in the form of relatively light refractory particles 34 interspersed in glassy phase 32. Glassy phase 32 and refractory particles 34 may be as defined above with respect to FIGS. 1–3. However, it is preferred that glassy phase 32 have a softening point greater than that of glassy phase 20F and that glassy phase 24F have a softening point greater than that of glassy phase 32F. In other words, each layer of label 10F preferably incorporates a glassy phase having a higher softening point than any of the glassy phase(s) in the underlying layer(s). More preferably, the softening point of glassy phase 32 is 5° C. to about 50° C., preferably 5° C. to 20° C., greater than the softening point of glassy phase 20, and the softening point of glassy phase 24 is 5° C. to about 50° C., preferably 5° C. to 20° C., greater than the softening point of glassy phase 32F.

Labels according to the present invention may be made using a variety of approaches. For example, a base layer may be obtained from a slurry incorporating refractory particles 22, a glass frit corresponding to glassy phase 20, a polymeric binder, and a solvent. Optional ingredients include an organic plasticizer, dispersants to facilitate dispersion of the refractory and glass flit particles, and the like. If the particle sizes of the refractory particles and/or the glass frit are too large at the outset, particle sizes may be reduced to the desired size using any suitable size reducing technique in the art such as crushing, wet ball milling, dry ball milling, jet milling, and the like.

The solvent may be water or a nonaqueous liquid, or combinations thereof. The preferred solvent is a nonaqueous liquid such as dichloromethane, trichloroethane, methyl ethyl ketone, toluene, ethyl alcohol, combinations of these, and the like. Typically, the slurry includes from about 40 to about 70 percent by volume of the solvent, based upon the total volume of the slurry ingredients.

The polymeric binder and organic plasticizer, if any, may be any of those materials known in the art to aid in the formation of a green article. The term "green" with respect to a ceramic article means that the ceramic article includes organic constituents and is not heat-treated or is incompletely heat-treated. Useful organic plasticizers include glycerol, polyethylene glycol, dioctyl phthalate, combinations of these, and the like. The weight ratio of the plasticizer to total weight of glass frit and refractory particles is typically in the range from about 1:10 to about 1:25. Suitable polymeric binders include acrylic polymer, polyvinyl butyral, polyvinyl alcohol, and the like, and may be selected depending on the solvent being used in accordance with conventional practices. The weight ratio of polymeric binder to total weight of glass frit and refractory particles is typically in the range from about 1:9 to about 1:15.

The slurry may further comprise dispersing aids known in the art. Representative examples of commercially available dispersants include a sodium salt of a carboxylate polyelectrolyte dispersant (available, for example, under the trade designation "TAMOL 731" from Rohm & Haas Co., Philadelphia, Pa.). Another useful additive is a defoaming agent (available, for example, under the trade designation "SURFYNOL 104E" from Air Products Co., Allentown, Pa.).

To form the slurry, the ingredients can be combined in a suitable mixing apparatus, such as a media mill, and mixed until the slurry has a viscosity appropriate for casting. To remove air which may be trapped in the slurry as a result of mixing, the slurry is preferably deaerated under a vacuum, for example, by use of an aspirator or vacuum pump, prior to forming the slurry into the shape of a base layer sheet. A suitable vacuum is about 1 torr. Deaerating may also occur, for example, by slow speed (e.g., 1 rpm) rolling on a roller.

After the slurry is formed and optionally deaerated, the slurry can be formed into the desired shape (e.g., a sheet or wafer shape) using conventional techniques such as tape casting, slip casting, screen printing, gravure coating, knife coating, and the like. The preferred method for shaping the slurry is tape casting. Tape casting is a conventional method that utilizes a doctor blade or knife blade to coat the slurry onto a release liner. To accomplish tape casting, the viscosity of the slurry is preferably in the range from about 2000 to 2900 cps, as determined under ambient conditions using a Brookfield viscometer fitted with a No. 3 spindle at 100 rpm. If the viscosity of the slurry is too low after milling, the viscosity can be increased by removal of a portion of the solvent prior to tape casting. Typically, solvent is removed from the slurry by evaporation during mixing.

Typically, a sheet is first cast onto a carrier support, then carefully dried to produce an uncracked, unwarped green article, which is subsequently cut into wafer-shaped pieces. Drying can be accomplished using any of several conventional liquid media removal techniques including heating. Preferably, the green label pieces are dried in air at room temperature or heated in air at a temperature in the range from about 30° C. to about 50° C. The thickness of a green tape after drying is typically in the range from about 0.1 mm to about 2 mm.

Additional layers may be formed on the green base layer by coating, laminating, or ink jet printing, or the like. For example, a slurry of ingredients as described above except having ingredients corresponding to those of the green, additional layer to be coated can be applied to a surface of the underlying, green pieces. A typical wet coating thickness is in the range from 3 micrometers to 20 micrometers. The coating slurry can be applied to the surface using techniques known in the art as listed above. The coated article is then preferably dried. The coating and drying process may be repeated to add more layers as desired. After the last layer has dried, the multilayer, green structure may be cut into desired shapes or pieces.

In an alternative approach for forming the multilayer green label, green sheets of each layer can be separately prepared using the procedures described above. The sheets, whether two or more, can then be stacked and laminated together using appropriate pressure and temperature. For example, a lamination pressure of 3000 psi (20.7 MPa) and lamination temperature of 65° C. have been found to be suitable for some compositions. After lamination, the multilayer, green structure can be cut into the desired pieces. According to another approach, additional metal, ceramic, and/or glass coatings can be formed on the base layers using ink jet printing techniques. When using ink jet printing techniques, a patterned top layer can be directly formed without intervening abrading, ablation, or etching steps.

Firing of the green, dried, multilayer label pieces preferably occurs under conditions such that the resultant fired label includes substantially no organic constituents other than carbon. More preferably, firing occurs under conditions such that the resultant fired label is at least partially sintered, and more preferably under conditions such that the resultant fired label is substantially fully sintered. A substantially fully sintered article refers to a fired article having a density of at least 80%, preferably at least 85%, more preferably at least 90%, and even more preferably at least 95% of theoretical.

To accomplish firing, the green article may be heated from room temperature to the desired maximum firing temperature under conditions effective to burn out organic constituents without causing the article to suffer from undue thermally induced damage. The preferred heating rate is dependent upon a variety of factors including the atmosphere in which the article is heated, the amount and type of organic substituent present, and the desired color of the base material to be fired. Preferably, the heating rate is slow enough to avoid cracking, bloating, undue shrinkage, or distortion of the green article during firing. The heating rate should also occur at a rate slow enough to prevent carbon trapping in label embodiments including a white base layer. For embodiments including a black base layer, carbon trapping might add black color to the base layer, so a faster heating rate can be used so long as the label maintains dimensional and structural integrity during firing. Preferably, firing occurs in air. Firing may occur by heating the green article to the maximum firing temperature in one or more heating stages, as desired.

Preferably, the maximum temperature to which the green article is heated during firing is sufficiently greater than the softening point(s) of the glassy phase(s) incorporated into the green article to facilitate sintering without loss of dimensional and/or structural integrity of the article. If the difference between the maximum firing temperature and the softening point of a particular glassy phase is too small, then that glassy phase might be too porous after firing, and therefore too weak mechanically. On the other hand, if the difference between the maximum firing temperature and the softening point of a particular glassy phase is too great, then the viscosity of that glassy phase might be too low during firing and/or during attachment to a substrate. The latter can cause such a glassy phase to flow out from the label too much, leading to excessive stickiness and/or a loss of structural and/or dimensional integrity.

Accordingly, in preferred embodiments, the maximum firing temperature is selected to be in the range from about 25° C. to about 300° C., preferably 50° C. to about 150 ° C., greater than the softening point(s) of the glassy phases incorporated into a label according to the present invention. Given a desired application temperature, the maximum firing temperature is also desirably less than the desired application temperature. For example, using a maximum firing temperature that is 50° C. to 250° C. below the application temperature would be suitable. To illustrate examples of such relationships, the following table shows suitable ranges of firing temperatures for corresponding softening point and application temrperatures:

| Application Temperature | Firing Temperature Range | Softening Point Range |
|---|---|---|
| 550° C. | 300° C. to 500° C. | 250° C. to 450° C. |
| 750° C. | 500° C. to 700° C. | 450° C. to 650° C. |
| 800° C. | 550° C. to 750° C. | 500° C. to 700° C. |

After firing, a desired code pattern can then be formed in the top layer (unless the top layer is already patterned (e.g., because ink jet printing or a similar technique was used), as desired, either before and/or after the label is attached to its substrate. The code pattern preferably comprises alphanumeric information, bar code information, pictorial information, Braille, other identifiable characters, combinations of these, or the like. The code pattern may be human readable, machine readable (e.g., readable by a bar code scanner), combinations of these, or the like. In embodiments in which the code pattern comprises a bar code, representative examples of the many varieties of suitable bar codes include 2 of 7 Code, 3 of 9 Code, ACI, AGES, Ames, Anker, AS-6, AS-10, Bar/Half Bar, Bi-Level Code, Binary Code, Binary Coded Decimal, Bulls Eye Code, Codabar, Code 11, Code 39, Code 93, Code 128, Code B, Color Bar Code, Delta Distance A, Delta Distance B, Delta Distance C, Digital Code, Distribution Symbol, Double Track Symbol Code, European Article Numbering (EAN), F2F, Frequency Code, Fujitsu, IER, International Article Numbering (IAN), Interleaved 2 of 5, Matrix Two of Five, Modified BCD, MSI Bar Code, Nixdorf, Norand, Octal Coded Decimal, Periodic Binary, Plessary Code, Presence/Absence Code, PWM, RTC, Scope Code, Siemens Code, Sunburst Bar Code, Telepan, Ten Segment Decimal Code, Toshiba, Two of Five, Two of Five Matrix, Universal Product Code (UPC), USD-1, USD-2, USD-3, USD-4, USD-5, USD-6, USD-7, USD-8, Wagon Wheel Code, World Product Code (WVVC), and Zellweger Code. Of these, bar codes that are widely used include Code 39, UPC, EAN, 2 of 5, Interleaved 2 of 5, Codabar, and Plessey Code.

The resultant code pattern provides a convenient method of identifying the substrate to which the label bearing the code pattern is attached. For example, if the code pattern includes a bar code, a bar code scanner can be used to rapidly and accurately read the code pattern in order to identify the corresponding substrate. As is well known in the art, a typical bar code includes a number of printed bars and intervening spaces. The widths of the bars and spaces, as well as the number of each, correspond to different characters. The meaning to be attributed to such features is given by the specification for a particular bar code. Bar codes can encode letters, numbers, and other graphic symbols. Most typically, bar codes encode primarily numeric information.

In a typical bar code scanning operation, either a stationery or a hand-held bar code scanner emits an interrogation beam of electromagnetic radiation (e.g., light) which is swept across the bar code. Laser light is commonly used as the interrogation beam, although other forms of light may be used. A suitable light source may comprise IR light, visible light, UV light, or the like. To ensure that the bar code characters can be read with good resolution, the width of the interrogation beam is preferably no greater than about 1.4 times the minimum width of the thinnest bar code character. When the interrogation beam hits the bar code, the beam is reflected back towards the scanner. The scanner includes componentry for detecting the light intensity of the reflected beam. Portions of the interrogation beam reflected from dark characters or portions of the bar code will have less intensity than portions of the interrogation beam reflected from light characters or portions of the bar code. Thus the light reflected from the bar code will vary in intensity in a manner corresponding to the light and dark characters or portions of the bar code. A signal processing system included in the scanner, or operationally coupled to the scanner, then translates such variation in the reflected light intensity in order to decode the bar code. For additional information regarding bar codes see, for example, Craig K. Harmon and Russ Adams, *Reading Between the Lines, An Introduction to Bar Code Technology*, Chapter 3 (Helmers Publishing, Inc., 1984), the disclosure of which is incorporated herein by reference.

In some instances, it may be desirable to update the code pattern formed in labels according to the present invention. For example, during the course of production of cathode ray tube glass components, different components may be subjected to a different sequences of processing conditions depending upon the desired end uses of those components. In order to keep track of what sequence of conditions was used for each component, it may be desirable to update the label attached to the component with one or more additional code patterns corresponding to the one or more different processing conditions applied to the substrate. Thereafter, the code patterns on a label can be read and decoded to quickly and accurately determine the production history of the corresponding component.

The present invention will now be further described with reference to the following examples.

EXAMPLE 1

A 2600 cm$^3$ porcelain ball mill jar with a diameter of about 18.0 cm was charged with about 1400 grams of alumina grinding media (1.5 cm diameter; commercially available from U.S. Stoneware Co. of Mahwah, N.J.), about 600 grams of trichloroethane, about 50 grams of methyl ethyl ketone (MEK), 40 grams of dioctyl phthalate (commercially available under the trade designation "DOP" from Aldrich Chemical Co. of Milwaukee, Wis.), 36 grams of isopropanol, 50 grams of methylene chloride, 97.5 grams of a first glass frit (available under the trade designation "EG2712" from Ferro Corp., Cleveland, Ohio; softening point of 650° C.; coefficient of thermal expansion of $8.0 \times 10^{-6}/°$ C.), 97.5 grams of a second glass frit (available under the trade designation "EG3012" from Ferro Corp.; softening point of 471° C.; coefficient of thermal expansion of $11.8 \times 10^{-6}/°$ C.), and 105 grams of high purity mullite powder (Baikawski International Corp., Charlotte, N.C.). Both flits were free of the undesirable heavy metals.

The ingredients were ball milled at a speed of about 100 rpm for about four hours. About 60 grams of an acrylic copolymer latex emulsion ( available under the trade designation "RHOPLEX B-60A" from Rohm and Haas, Philadelphia, Pa.), was added to the ball mill. The ingredients were then ball milled for an additional three hours.

About 150 milliliters of the resulting ball-milled slurry was transferred to a three neck flask (250 ml capacity) and placed under vacuum at 1 torr using a vacuum pump to deaerate while the slurry was stirred. The slurry thickened during stirring as liquid media evaporated. When the viscosity of the slurry increased to about 2900 cps measured at about 25° C. using a Brookfield viscometer fitted with a No. 3 spindle operated at 100 rpm, the deaerated slurry was then uniformly cast onto a silicone-coated polyester film using a conventional doctor-blade tape casting machine. The casting was allowed to dry at room temperature for about 10 hours.

The resultant dried, green casting was then stripped from the polyester film to provide a green sheet with a thickness of about 300 micrometers to 400 micrometers. The term "green" means that the structure included organic constituents. In terms of the actual, visually observable color, the mullite constituent provided the green sheet with a white color. The green sheet was cut into a number of 3.2 cm by 2.4 cm base layer pieces and a number of 2.0 cm by 8.0 cm base layer pieces. Black colored enamel paste (an oil base enamel available under the trade designation "VERSA COLOR" from American Art Clay Co., Inc., Indianapolis, Ind.) was then knife coated onto one side of each dried green base layer piece at a wet coating thickness of about 50–100 micrometers. On some samples, the black colored enamel paste was painted onto one side of each dried green base layer piece with a wet coating thickness of about 50–100 micrometers. The coated green samples were dried in an oven at about 70° C. for about 3 hours.

The resulting green labels were then fired in a conventional resistive furnace in air according to the following firing schedule:

(1) heated from room temperature to 350° C. at 2° C./minute;
(2) held at 350° C. for one hour;
(3) heated from 350° C. to 675° C. at 2° C./minute; and
(4) held at 675° C. for 24 minutes.

The linear shrinkage of the fired composite ceramic label articles was about 12 percent. The camber of the fired composite ceramic label articles was less than about 0.05 mm. The densities of the fired composite ceramic label articles were about 1.5–1.7 g/cm$^3$. The colors of the base layer and top coating layer of the fired composite ceramic labels were white and black, respectively.

To demonstrate application of the coated ceramic labels to hot cathode ray tube glasses at an application temperature of 750° C., flat cathode ray tube glass pieces (from Philips Corp. of Aachen, Germany) were heated to 750° C. in a conventional resistive furnace. The cathode ray tube glass pieces were each about 5 cm×10 cm×0.6 cm and had a coefficient of thermal expansion of about $9.8 \times 10^{-6}/°$ C. The composition of the cathode ray tube glass pieces were as follows (in weight percent): $SiO_2$-53.5; $Al_2O_3$-5.2; $Na_2O$-6.7; $K_2O$-7.8; $MgO+CaO$-1.75; $PbO$-23.5; $SrO$-0.5; $BaO$-0.6; $Sb_2O_3$-0.3; $Fe_2O_3$-<0.35; and the remainder at <0.2. After the cathode ray tube glasses reached 750° C., samples of the fired ceramic label articles were directly placed on the hot cathode ray tube glasses. The temperature was held at 750° C. for about 10 minutes before the furnace was turned off and the samples were allowed to cool down to room temperature over about one hour. The samples were examined to evaluate adhesion of the fired ceramic labels to the cathode ray tube glasses. All of the labels were observed to be tightly bonded to the surface of the cathode ray tube glasses.

EXAMPLE 2

A 1000 cm$^3$ porcelain ball mill jar with a diameter of about 13.0 cm was charged with about 500 grams of alumina grinding media (1.5 cm diameter), about 300 grams of trichloroethane, about 25 grams of MEK, 20 grams of dioctyl phthalate, 18 grams of isopropanol, 25 grams of methylene chloride, 48.75 grams of a first glass frit ("EG2712"), 48.75 grams of a second glass frit ("EG3012"), and 52.5 grams of monoclinic zirconia powder (commercially available as "HPZ 1000" from TAM Ceramics Co. Niagara Falls, N.Y.). The ingredients were ball milled at a speed of about 100 rpm for about four hours. About 30 grams of acrylic copolymer latex emulsion ("RHOPLEX B-60A") was added to the ball mill. The ingredients were then ball milled for an additional three hours.

About 80 ml of the resulting ball milled slurry was transferred to a three neck flask (100 milliliter capacity) and placed under vacuum at 1 torr using a vacuum pump to deaerate while the slurry was stirred. The slurry thickened during stirring as liquid media evaporated. When the viscosity of the slurry increased to about 2900 cps as measured in accordance with the viscosity measuring procedure of Example 1, the deaerated slurry was then uniformly cast onto a silicone-coated polyester film using a conventional doctor-blade tape casting machine. The cast slurry was dried at room temperature in air for about five hours. The cast tape was then stripped from the polyester film to provide a green sheet having a thickness of 350 micrometers. The green sheet was cut into 3.2 cm by 2.4 cm base layer pieces and 2.0 cm by 8.0 cm base layer pieces. Black colored enamel paste ("VERSA COLOR") was then brush coated onto one side of the dried green base layer pieces to give a wet coating thickness of about 50 micrometers. The coated green samples were dried in an electric oven at about 70° C. for about three hours.

The resulting green labels were then fired in a conventional resistive furnace in air according to following firing schedule:

(1) heated from room temperature to 270° C. at 1° C./minute;
(2) held at 270° C. for one hour;
(3) heated from 270° C. to 650° C. at 1° C./minute; and
(4) held at 650° C. for 24 minutes.

The linear shrinkage of the fired composite ceramic label articles was about 12 percent. The camber of the fired composite ceramic label articles was less than 0.05 mm. The densities of the fired composite ceramic label articles were about 1.7–1.8 g/cm$^3$. The colors of the base layer and top coating layer of the fired labels were white and black, respectively.

To demonstrate application of one of the coated ceramic label samples to hot cathode ray tube glasses at an application temperature of 800° C., a flat cathode ray tube glass piece (see Example 1) was heated to 800° C. in a conventional resistive furnace. After the cathode ray tube glass reached 800° C., the fired ceramic label article was directly placed onto the hot cathode ray tube glass and held at 800° C. for about five minutes before the furnace was turned off and cooling was allowed to occur down to room temperature over about 45 minutes. The sample was observed to be tightly bonded to the surface of the cathode ray tube glass.

EXAMPLE 3

Coated green labels were prepared using the procedure of Example 2, except that titania powder (commercially available under the trade designation "TiONA TiO$_2$" from SCM Chemicals Co., Baltimore, Md.) was used in place of the zirconia. The resulting green label articles were then fired in a conventional resistive furnace in air according to following firing schedule:

(1) heated from room temperature to 250° C. at 1° C./minute;

(2) held at 250° C. for 2 hours;

(3) heated from 250° C. to 650° C. at 1° C./minute; and (4) held at 650° C. for one hour.

The linear shrinkage of the fired composite ceramic label articles was about 12 percent. The camber of the fired composite ceramic label articles was less than about 0.05 mm. The densities of the fired composite ceramic label articles were about 1.6–1.8 g/cm$^3$. Colors of the base layers and top coating layers were white and black, respectively.

To demonstrate application of one of the coated ceramic labels to hot cathode ray tube glasses at an application temperature of 750° C., a curved cathode ray tube glass piece (see Example 1) was heated to 750° C. in a conventional resistive furnace. The diameter of the cathode ray tube glass piece was about 7.5 cm and its thickness was about 0.6 cm. After the cathode ray tube glass reached 750° C., a fired ceramic label article was directly placed onto the hot cathode ray tube glass before the furnace was turned off and cooling was allowed to occur down to room temperature over 30 minutes. The label easily conformed to the curved surface of the cathode ray tube glass. The ceramic label was observed to be tightly bonded to the surface of the cathode ray tube glass.

EXAMPLE 4

This example describes the preparation of fired two layer ceramic labels which include a top, white coating layer and a black base layer and that can be fused to hot cathode ray tube glasses at application temperatures in the range from about 470° C. to about 570° C.

A 1000 cm$^3$ porcelain ball mill jar with a diameter of about 13.0 cm was charged with about 500 grams of alumina grinding media, about 300 grams of trichloroethane, about 25 grams of MEK, 20 grams of dioctyl phthalate ("DOP"), 18 grams of isopropanol, 25 grams of methylene chloride, and 97.5 grams of a glass frit (obtained from Ferro Corp. under the trade designation "DPM003" and having the composition (in weight percent) as follows: SnO-54.3, ZnO-9.5, and P$_2$O$_5$-36.3); softening point of 293° C.; coefficient of thermal expansion of 10.8×10$^{-6}$/° C.). This glass frit included no Pb, Hg, As, Co, Cd, or Cr(VI). The ingredients were ball milled at a speed of about 100 rpm for about four hours. About 30 grams of copolymer latex emulsion ("RHOPLEX B-60A") were then added to the ball mill, and the ingredients were ball milled for an additional three hours. About 80 ml of the resulting slurry mixture was transferred to a flask. About 40 grams of silicon carbide powder (commercially available as "UF-05" from H.C. Starck Inc., Newton, Mass.), and 12.5 grams of black CoCrFeNi pigment (available as "F-3794" from Ferro Corp.), were added to the resulting ball-milled slurry and stirred at about 300 rpm using a conventional air propelled mixer having a 3.2 centimeter blade. About 80 ml of the resulting slurry mixture was transferred to a three neck flask (100 milliliter capacity) and placed under vacuum at 1 torr using vacuum pump to deaerate while the slurry was stirred. The slurry thickened during stirring as liquid media evaporated. When the viscosity of the slurry increased to about 2900 cps when measured as described in Example 1, the deaerated slurry was then uniformly cast onto a silicone-coated polyester film using a conventional doctor-blade tape casting machine.

The cast slurry was dried at room temperature in air for about five hours. The cast tape was then stripped from the polyester film to provide a green sheet having a thickness of 350 micrometers. The green tape was cut into 2.0 cm by 8.0 cm base layer pieces. White color enamel paste was then brush coated onto one side of the dried green base layer pieces at a wet coating thickness of about 50 micrometers. The paste was a 70/30 wt. % mixture of white enamel powder and squeegee oil (available under the trade designation "A4" from American Art Clay Co. Inc.). The coated, green base layer pieces were dried in an electric oven at about 70° C. for about three hours.

The resulting green label articles were then fired in a conventional resistive furnace in air according to following firing schedule:

(1) heated from room temperature to 400° C. at 5° C./minute; and (2) held at 400° C. for 24 minutes before cooling down to room temperature over two hours.

The linear shrinkage of the fired composite ceramic label articles was about 12 percent. The camber of the fired two-layer ceramic labels was less than 0.05 mm. The density of the fired two-layer ceramic labels was about 1.6 g/cm$^3$. The colors of the base layers and top coating layers of the fired labels were black and white, respectively.

To demonstrate application of one of these coated ceramic labels to a hot cathode ray tube glass at an application temperature of about 530° C., a flat cathode ray tube glass piece (see Example 1) of about 5 cm×10 cm×0.6 cm was heated to about 530° C. A fired ceramic label was directly placed on the hot cathode ray tube glass, and the temperature was held at 530° C. for about five minutes before the furnace was turned off and cooling was allowed to occur down to room temperature over about 30 minutes. The ceramic label was observed to be tightly bonded to the surface of the cathode ray tube glass.

EXAMPLE 5

A 450 cm$^3$ glass jar with a diameter of about 7.0 cm was charged with about 100 grams of glass balls (50% of glass balls with a diameter of 16 millimeters and 50% of glass balls with a diameter of 12.5 millimeters; available from Jencors company, Bridgeville, Pa.), 50 grams of a first glass flit ("EG3012"), 50 grams of a second glass frit ("EG2712"), 0.5 gram of a dispersant (commercially available under the trade designation "TAMOL 731" from Rohm and Haas Co.), 0.45 gram of a defoaming agent (available under the trade designation "SURFYNOL 104 E" from Air Products Co., Allentown, Pa.), 12.8 grams of acrylic copolymer latex emulsion binder ("RHOPLEX B-60A"), and 30 grams of deionized water. The ingredients were ball milled at a speed of 100 rpm for about five hours. Some of the resulting slurry was transferred to a 100 ml three neck flask which was evacuated to 1 torr using a vacuum pump to deaerate. The deaerated slurry mixture was then uniformly cast onto a silicone-coated polyester film using a conventional doctor-blade tape casting technique. The cast tape was allowed to dry at room temperature for about 10 hours. The dried tape was then stripped from the polyester film to provide a green sheet with a thickness of 150 micrometers. The green sheet was cut into 4.0"×4.0" (about 10 cm×10 cm) base layer pieces. In order to produce a black colored top layer with metal, the dried green base layer pieces were screen printed with a palladium/silver metal paste (commercially available under the trade designation "PD/AG 6120" from E.I. Dupont de Nemours and Company of Wilmington, Del.). The screen printed metal paste was then dried in an oven at about 80° C. for about 30 minutes.

The resulting two layer labels were then cut into 1.0" (2.5 cm)×3.0" (7.5 cm) pieces and fired in a conventional resistive furnace in air according to the following schedule:

(1) heating from room temperature to 350° C. at 2° C./minute;
(2) holding at 350° C. for one hour;
(3) heating from 350° C. to 675° C. at 2° C./minute; and
(4) holding at 675° C. for 24 minutes.

The colors of the base layers and top coating layers of the fired labels were white and black, respectively.

To demonstrate application of the two layer ceramic labels to hot cathode ray tube glass at an application temperature of 750° C., a flat cathode ray tube glass piece with a size of about 5 cm×10 cm×0.6 cm (see Example 1) was heated to 750° C. in a conventional resistive furnace. After the cathode ray tube glass reached 750° C., a fired, two layer ceramic label was directly placed onto the hot cathode ray tube glass and held at 750° C. for about 10 minutes before the furnace was turned off and the sample cooled down to room temperature over about one hour. The label was observed to be firmly bonded to the surface of the cathode ray tube glass.

EXAMPLE 6

This example describes the fabrication of a two layer green label using lamination techniques.

First, a green base layer was produced by tape casting a slurry mixture which was ball milled through following procedure: A 450 cm³ glass jar with a diameter of about 7.0 cm was charged with about 100 grams of glass balls (50% of glass balls with diameter of 16 millimeters and 50% of glass balls with diameter of 12.5 millimeters), 65 grams of a glass frit ("DPM003"), 2 grams of 100% pure corn oil (available under the trade designation "MAZOLA" from Best Foods, CPC International Inc., Englewood Cliffs, N.J.), 167 grams of toluene, 7.5 grams of a polyethylene glycol (available under the trade designation "CARBOWAX METHOXY POLYETHYLENE GLYCOL 2000" from Union Carbide Co., Danbury, Conn.), and 12.4 grams of dioctyl phthalate ("DOP"). The ingredients were ball milled at a speed of about 100 rpm for about five hours. About 10.7 grams of polyvinyl butyral (Aldrich Chemical Co.), 28 grams of silicon carbide particles (Grade 1200, mean diameter of 4.9 micrometers, Superior Graphite Co., Chicago, Ill.), and 14 grams of graphite powder (Sherritt Gordon Mines LTD, Alberta, Canada) were added to the ball mill. The ingredients were then ball milled for an additional 2 hours. The resulting ball-milled slurry was transferred to an open beaker and stirred at about 300 rpm using a conventional air propelled mixer having a 3.2 centimeter blade. The slurry mixture thickened during stirring as liquid media evaporated. When the viscosity of the slurry mixture increased to about 2900 cps when measured as described in Example 1, the mixture was placed in a 100 ml three neck flask which was evacuated to 1 torr using a vacuum pump to deaerate. The deaerated slurry mixture was then uniformly cast onto a silicone-coated polyester film using a conventional doctor-blade tape casting technique. The cast tape was allowed to dry at room temperature for about 8 hours. The dried tape was then stripped from the polyester film to provide a green sheet with a thickness of 500 micrometers. The green sheet was cut into 4.0" (10 cm)×4.0" (10 cm) base layer pieces.

A top layer green tape was produced by tape casting a slurry mixture which was ball milled through following procedure: A 200 cm³ glass jar was charged with about 50 grams of glass balls (16 millimeter diameter), 30 grams of a glass frit (obtained from Ferro Corp. under the designation "DPM004" and having the composition (in weight percent) as follows: SnO-36.4, ZnO-24.1, and $P_2O_5$-39.6); softening point of 350° C., a coefficient of thermal expansion of $8.8 \times 10^{-6}$/° C.; notwithstanding the low softening point, this glass frit included no Pb, Hg, As, Co, Cd, or Cr(VI)), 20 grams of titania powder ("TiONA $TiO_2$"), 6.4 grams of acrylic copolymer latex emulsion ("RHOPLEX B-60A"), 0.25 gram of dispersant ("TAMOL731"), 0.23 gram of defoaming agent ("SURFYNOL 104 E"), and 20.0 grams of deionized water. The ingredients were ball milled at a speed of 100 rpm for about three hours. The resulting slurry was transferred to a 100 ml three neck flask which was evacuated to 1 torr using a vacuum pump to deaerate. The deaerated slurry mixture was then uniformly cast onto a silicone-coated polyester film using a conventional doctor-blade tape casting technique. The cast tape was allowed to dry at room temperature for about 8 hours. The dried tape was then stripped from the polyester film to provide a green sheet with a thickness of 8 micrometers. The green sheet was cut into 4.0" (10 cm)×4.0" (10 cm) top layer pieces.

Two layer laminates were formed by laminating a base layer piece and a top layer piece together at a temperature of 65° C. for 30 seconds at a pressure of 3000 psi (20.7 MPa). The two layer laminate was then cut into 1.0" (2.5 cm)×3.0" (7.5 cm) label pieces.

The resulting green labels were then fired in a conventional resistive furnace in air according to the following schedule:

(1) heating from room temperature to 250° C. at 2° C./min.;
(2) holding at 250° C. for one hour;
(3) heating from 250° C. to 400° at 2° C./min; and
(4) holding at 400° C. for 0.4 hour.

The colors of base and top layers of the fired ceramic labels produced were black and white, respectively.

To demonstrate application of the two layer ceramic labels to hot cathode ray tube glass at application temperature of 530° C., a flat cathode ray tube glass piece with size of about 5.0 cm×10.0 cm×0.6 cm (see Example 1) was heated to 530° C. in a conventional resistive furnace. After the cathode ray tube glass reached 530° C., a fired ceramic label was directly placed on the hot cathode ray tube glass. The temperature was held at 530° C. for about one minute before the furnace was turned off, and the sample was allowed to cool down to room temperature over about one hour. The label was observed to be firmly bonded to the surface of the cathode ray tube glass.

EXAMPLE 7

A 450 ml glass jar with a diameter of about 7.0 cm was charged with about 100 grams of glass balls (50% of glass balls with a diameter of 16 millimeters and 50% of glass balls with a diameter of 12.5 millimeters), 65 grams of a first glass frit ("DPM003"), 15 grams of a second glass flit ("DPM004"), 20 grams of silicon carbide particles (Grade 1200, mean diameter of 4.9 micrometers, Superior Graphite Co., Chicago, Ill.), 15 grams of CoCrFeNi black pigment ("F-3794"), 0.5 gram of dispersant ("TAMOL 731"), 0.45 gram of defoaming agent ("SURFYNOL 104 E"), 12.8 grams of acrylic copolymer latex emulsion binder ("RHOPLEX B-60A"), and 30 grams of deionized water. The ingredients were ball milled at a speed of 100 rpm for about three hours. About 100 ml of the resulting slurry was transferred to a 100 ml three neck flask which was then placed under vacuum at 1 torr using a vacuum pump to deaerate. The deaerated slurry mixture was then uniformly cast onto a silicone-coated polyester film using a conventional doctor-blade tape casting technique. The cast tape was allowed to dry at room temperature for about 10 hours. The dried tape was then stripped from the polyester film to provide a green sheet with a thickness of about 200 micrometers. The green sheet was cut into 1.0" (2.5 cm)×4.0" (10 cm) base layer pieces.

For the production of a white colored top layer, a mixture of 4.3 grams of squeegee oil (available under the trade designation "A-4" from Thompson Enamel Co., Bellevue, Ky.), 7 grams of the glass frit used in the top layer of Example 6, and 3 grams of titania powder ("TiONA TiO$_2$") was brushed onto the base layer pieces at a coating thickness of about 20 micrometers.

The coated labels were then fired in a conventional resistive furnace in air according to the following schedule:

(1) heating from room temperature to 450° C. at 5° C./minute; and (2) holding at 450° C. for 24 minutes.

The colors of the top and base layers of the fired samples were white and black, respectively.

To demonstrate application of the ceramic labels to hot cathode ray tube glass at an application temperature of 530° C., a curved cathode ray tube glass piece with a size of about 5 cm×10 cm×0.6 cm (see Example 1) was heated to 530° C. in a conventional resistive furnace. After the cathode ray tube glass reached 530° C., a fired label was directly placed onto the hot cathode ray tube glass and held at 530° C. for about 30 seconds before the furnace was turned off and the sample cooled down to room temperature over about one hour. The label was observed to be firmly adhered to the surface of the cathode ray tube glass.

EXAMPLE 8

This example describes the fabrication of a three layer ceramic label using lamination and coating techniques.

An intermediate layer green tape was produced by tape casting a slurry mixture which was ball milled through following procedure: A 450 ml glass jar with a diameter of about 7.0 cm was charged with about 100 grams of glass balls (50% of glass balls with a diameter of 16 millimeters and 50% of glass balls with a diameter of 12.5 millimeters), 65 grams of a glass frit ("DPM004"), 35 grams of titania powder ("TiONA TiO$_2$"), 0.5 gram of dispersant ("TAMOL 731"), 0.45 gram of defoaming agent ("SURFYNOL 104 E"), 12.8 grams of copolymer latex emulsion ("RHOPLEX B-60A"), and 30 grams of deionized water. The ingredients were ball milled at a speed of 100 rpm for about five hours. About 100 ml of the resulting slurry was transferred to a 100 ml three neck flask which was then placed under vacuum at 1 torr using a vacuum pump to deaerate. The deaerated slurry mixture was then uniformly cast onto a silicone-coated polyester film using a conventional doctor-blade tape casting technique. The cast tape was allowed to dry at room temperature for about 10 hours. The dried tape was then stripped from the polyester film to provide a green sheet with a thickness of 150 micrometers. The green tape thus produced was cut into 4.0" (10 cm)×4.0" (10 cm) pieces. One of these green pieces was stacked on a black color, green base layer tape (thickness of 200 micrometers) produced in accordance with Example 7. The two green pieces were laminated at a temperature of 65° C. for 30 minutes at a pressure of 3000 psi (20.7 MPa). The two layer laminate was then cut into 1.0" (2.5 cm)×4.0" (10 cm) pieces. For the production of a black colored top layer, a mixture of 4.3 grams of squeegee oil ("A-4"), 7 grams of a glass frit ("DPM004"), and 3 grams of black pigment powder ("F-3794" CoCrFeNi, Ferro Corp., Cleveland, Ohio) was brush coated onto the white layer of the green laminate at a thickness of about 20 micrometers. The three-layer coated label was then fired in a conventional electrically resistive furnace in air according to following schedule:

(1) heating from room temperature to 450° C. at 5° C./minute; and (2) holding at 450° C. for 24 minutes.

The colors of the top, intermediate, and base layers were black, white, and black, respectively.

To demonstrate application of the ceramic label to hot cathode ray tube glass at an application temperature of 530° C., a curved cathode ray tube glass piece with a size of about 5 cm×10 cm×0.6 cm (see Example 1) was heated to 530° C. in a conventional resistive furnace. After the cathode ray tube glass reached 530° C., the fired ceramic label was directly placed onto the hot cathode ray tube glass. The temperature was held at 530° C. for about 30 seconds before the furnace was turned off and the sample was allowed to cool down to room temperature over about one hour. The label was observed to be firmly adhered to the surface of the cathode ray tube glass.

EXAMPLE 9

To prepare a base layer tape, a 450 ml glass jar with a diameter of about 7.0 cm was charged with about 100 grams of glass balls (50% of glass balls with a diameter of 16 millimeters and 50% of glass balls with a diameter of 12.5 millimeters), 21.7 grams of a first glass frit ("DPM004"), 65 grams of a second glass frit ("DPM003"), 17.5 grams of graphite powder (Sherritt Gordon Mines LTD), 0.5 gram of dispersant ("TAMOL 731"), 0.45 gram of defoaming agent ("SURFYNOL 104 E"), 12.8 grams of acrylic copolymer latex emulsion binder ("RHOPLEX B-60A"), and 46 grams of deionized water. The ingredients were ball milled at a speed of 100 rpm for about three hours. About 15 grams of milled glass fiber (available under the trade designation "739 EC 1/32" from Owens Corning Co., having an average diameter of 13.3 micrometers and an aspect ratio of 10) was added to the resulting ball-milled slurry. The ingredients were stirred at about 300 rpm using a conventional air propelled mixer having a 3.2 cm blade. About 100 ml of slurry mixture was then transferred to 100 ml three neck flask which was placed under vacuum of about 1 torr using a vacuum pump to deaerate. The deaerated slurry mixture was then uniformly cast onto a silicone-coated polyester film using a conventional doctor-blade tape casting technique. The cast tape was allowed to dry at room temperature for about 10 hours. The dried tape was then stripped from the polyester film to provide a green sheet with a thickness of about 300 micrometers. The green sheet was cut into 1.0" (2.5 cm)×4.0" (10 cm) base layer pieces.

For the production of a white colored top layer, a mixture of 4.3 grams of squeegee oil ("A-4"), 6 grams of a glass frit ("DPM004"), and 4 grams of titania powder (TiONA TiO$_2$) was brush coated onto the base layer green pieces at a thickness of about 20 micrometers. The coated green label was then fired in a conventional resistive furnace in air according to the following schedule:

(1) heating from room temperature to 450° C. at 5° /minute; and (2) holding at 450° C. for 24 minutes.

The colors of the top and base layers of the resultant fired ceramic label were white and black, respectively.

To demonstrate application of the two contrasting layer ceramic label to hot cathode ray tube glass at an application temperature of 530° C., a flat cathode ray tube glass piece with a size of about 5 cm×10 cm×0.6 cm (see Example 1) was heated to 530° C. in a conventional resistive furnace. After the cathode ray tube glass reached 530° C., the fired label was directly placed onto the hot cathode ray tube glass and held at 530° C. for about 10 seconds before the furnace was turned off. The sample was allowed to cool down to room temperature over about one hour. The label was observed to be firmly adhered to the surface of the cathode ray tube glass.

EXAMPLE 10

A one gallon (3.8 liter) glass jar with a diameter of about 14.0 cm was charged with about 1000 grams of glass balls (50% of glass balls with a diameter of 16 millimeters and 50% of glass balls with a diameter of 12.5 millimeters), 800 grams of a glass frit ("DPM003"). 175 grams of graphite powder (Superior Graphite Co.), 9.4 grams of phosphate ester (available under the trade designation "EMPHOS PS21A" from Witco Corp., New York, N.Y.), and 530 grams of a mixture of 66% by volume MEK with 34% by volume ethanol. The ingredients were ball milled at a speed of 100 rpm for about an hour. About 105 grams of polyvinyl butyral (Aldrich Chemical Co.), 70 grams of polyethylene glycol ("CARBOWAX METHOXY POLYETHYLENE GLYCOL 2000"), and 100 grams of dioctyl phthalate ("DOP") were added to the ball mill. The ingredients were then ball milled for an additional two hours.

The resulting ball-milled slurry was transferred to open beaker and about 175 grams of milled "739 EC 1/32" glass fiber having an average diameter of 13.3 micrometers and aspect ratio of 10 was added to the ball-milled slurry and stirred at about 300 rpm using a conventional air propelled mixer having a 3.2 cm blade. This slurry mixture was then transferred to a 1 gallon (3.8 liter) plastic bottle (available under the trade designation "NALGENE" from Nalgene of Chicago, Ill.) and slowly rolled at a speed of 1 rpm to get rid of air bubbles before casting onto a silicone-coated polyester film using a doctor blade tape casting machine (manufactured by AEM Co., San Diego, Calif., under the trade designation "AEM 2104").

The dried green tapes were then stripped from the polyester film to provide green sheets with a thickness of about 175 micrometers. The green sheets were cut into 4.0" (10 cm)×5.0" (12.5 cm) pieces. For the production of a white colored top layer, a half gallon (1.9 liter) glass jar with a diameter of about 12.0 cm was charged with about 500 grams of glass balls with a diameter of 16 millimeters, 350 grams of a glass frit ("DPM003"), 150 grams of titania powder ("TiONA $TiO_2$"), 4.7 grams of phosphate ester ("EMPHOS PS21A"), and 265 grams of solvent mixture of 66% by volume MEK with 34% by volume ethanol. The ingredients were ball milled at a speed of 100 rpm for about an hour. About 52.5 grams of polyvinyl butyral (Aldrich Chemical Co.), 35 grams of polyethylene glycol ("CARBOWAX METHOXY POLYEThLENE GLYCOL 2000"), and 50 grams of dioctyl phthalate ("DOP") were added to the ball mill. The ingredients were then ball milled for an additional two hours. The resulting ball-milled slurry was transferred to a half gallon (1.9 liter) plastic bottle ("NALGENE")and slowly rolled at a speed of 1 rpm for deaeration before casting onto a silicone coated polyester film using a tape casting machine ("AEM 2104"). The dried green tapes were then stripped from the polyester film to provide green sheets with a thickness of about 80 micrometers. The green sheets were cut into 4.0" (10 cm)×5.0" (12.5 cm) pieces. One of these white-colored pieces was placed onto four black colored pieces produced above to form a label having 5 layers. The stack was laminated at a temperature of 65° C. for 5 seconds at a pressure of 220 psi (1.5 MPa). The laminates were then cut into 12 mm×60 mm pieces. The resulting green labels were then fired in a conventional resistive furnace in air according to the following schedule:

(1) Room temperature to 400° C. at 5° C./min.; and
(2) Held at 400° C. for 0.4 hour.

The fired ceramic labels were placed onto hot cathode ray tube glasses (see Example 1) held at a temperature of 530° C. in the resistive furnace. The labels were allowed to firmly bond to the cathode ray tube glasses before the furnace was turned off and the samples were allowed to cool down to room temperature. The ceramic labels were observed to be firmly bonded to the surface of the cathode ray tube glasses. The white top layers of the ceramic labels were then etched by a laser beam produced by a static $CO_2$ laser machine (available under the trade designation "MAC 2000 $CO_2$" from Dynamark Co., Bloomfield, Conn.) in order to expose a portion of the underlying black base layer and thereby form bar code patterns on the surfaces of ceramic labels.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A labeled cathode ray tube, comprising:
   (a) a cathode ray tube ceramic surface having a first coefficient of thermal expansion; and
   (b) a fired composite ceramic label attached to said cathode ray tube ceramic surface, said composite ceramic label comprising:
      (A) a fired ceramic body comprising a base layer wherein at least a portion of the base layer proximal to the cathode ray tube ceramic surface has a second coefficient of thermal expansion, said base layer including:
         (i) a first glassy phase; and
         (ii) a first refractory phase interspersed with said first glassy phase; said first glassy phase bonding said label to said substrate; and
      (B) a top layer provided on said fired ceramic label body,
   wherein there is sufficient color contrast between said top layer and said fired ceramic body such that a code pattern is optically discernible, wherein said composite ceramic label includes said code pattern, and wherein the ratio of the first coefficient of thermal expansion to the second coefficient of thermal expansion is in the range from 0.8:1.0 to 1.0:0.8.

2. A labeled cathode ray tube, comprising:
   (a) a cathode ray tube ceramic surface having a compound curvature; and
   (b) a fired composite ceramic label attached to said cathode ray tube ceramic surface, said composite ceramic label comprising:
      (A) a fired ceramic body comprising a base layer, said base layer including:
         (i) a first glassy phase; and
         (ii) a first refractory phase interspersed with said first glassy phase, said first glassy phase bonding said label to said substrate; and (B) a top layer provided on said fired ceramic label body, wherein there is sufficient color contrast between said top layer and said fired ceramic body such that a code pattern is optically discernible and wherein said composite ceramic label includes said code pattern.

3. A labeled cathode ray tube, comprising:
 (a) a cathode ray tube ceramic surface; and
 (b) a fired composite ceramic label attached to said cathode ray tube ceramic surface, said composite ceramic label comprising:
  (A) a fired ceramic body comprising a base layer, said base layer including:
   (i) a first glassy phase having a fist softening temperature; and
   (ii) a first refractory phase interspersed with said first glassy phase, said first glassy phase bonding said label to said substrate; and
  (B) a top layer provided on said fired ceramic label body, said top layer comprising:
   (i) a second glassy phase having a second softening temperature; and
   (ii) a second refractory phase interspersed with said second glassy phase,
wherein said second softening temperature is greater than said first softening temperature, wherein there is sufficient color contrast between said top layer and said fired ceramic body such that a code pattern is optically discernible and wherein said composite ceramic label includes said code pattern.

4. A labeled cathode ray tube, comprising:
 (a) a cathode ray tube ceramic surface; and
 (b) a fired composite ceramic label attached to said cathode ray tube ceramic surface, said composite ceramic label comprising:
  (A) a fired ceramic body comprising a base layer, said base layer including:
   (i) 10 to 50 volume percent of a first glassy phase; and
   (ii) 50 to 90 volume percent of a first refractory phase interspersed with said first glassy phase, said first glassy phase bonding said label to said substrate; and
  (B) a top layer provided on said fired ceramic label body, said top layer comprising:
   (i) a second glassy phase having a second softening temperature; and
   (ii) a second refractory phase interspersed with said second glassy phase,
wherein there is sufficient color contrast between said top layer and said fired ceramic body such that a code pattern is optically discernible and wherein said composite ceramic label includes said code pattern.

5. A labeled cathode ray tube, comprising:
 (a) a cathode ray tube ceramic surface; and
 (b) a fired composite ceramic label attached to said cathode ray tube ceramic surface, said composite ceramic label substantially free of any heavy metal atoms of Pb, Cd, As, Hg, Co, and Cr(VI) comprising:
  (A) a fired ceramic body comprising a base layer, said base layer including:
   (i) a first glassy phase having a first softening temperature; and
   (ii) a first refractory phase interspersed with said first glassy phase, said first glassy phase bonding said label to said substrate; and
  (B) a top layer provided on said fired ceramic label body, said top layer comprising:
   (i) a second glassy phase having a second softening temperature; and
   (ii) a second refractory phase interspersed with said second glassy phase,
wherein said second softening temperature is greater than said first softening temperature, and wherein there is sufficient color contrast between said top layer and said fired ceramic body such that a code pattern is optically discernible and wherein said composite ceramic label includes said code pattern.

6. A labeled cathode ray tube, comprising:
 (a) a cathode ray tube ceramic surface; and
 (b) a fired composite ceramic label attached to said cathode ray tube ceramic surface, said composite ceramic label comprising:
  (A) a fired ceramic body comprising a base layer, said base layer including:
   (i) a first glassy phase having a first softening temperature; and
   (ii) a first refractory phase interspersed with said first glassy phase, said first glassy phase bonding said label to said substrate;
  (B) a top layer provided on said fired ceramic label body, said top layer comprising:
   (i) a second glassy phase having a second softening temperature; and
   (ii) a second refractory phase interspersed with said second glassy phase; and
  (C) an intermediate layer interposed between said base layer and said top layer,
wherein said second softening temperature is greater than said first softening temperature, and wherein there is sufficient color contrast between said top layer and said fired ceramic body such that a code pattern is optically discernible and wherein said composite ceramic label includes said code pattern.

7. The labeled cathode ray tube of claim 1, wherein said cathode ray tube ceramic surface is curved.

8. The labeled cathode ray tube of any one of claims 1–6, wherein said top and said ceramic body independently consist essentially of one or more ceramic oxides.

9. The labeled cathode ray tube of any one of claims 1–6, wherein said top layer consists essentially of a refractory material selected from the group consisting of a metal, an intermetallic metal, a metal alloy, and combinations thereof.

10. The labeled cathode ray tube of any one of claims 3–6, wherein said first refractory phase comprises a first plurality of refractory particles and said second phase comprises a second plurality of refractory particles, and wherein said first or second plurality of refractory particles is selected from the group consisting of silicon carbide, titanium carbide, zirconium carbide, graphite, and combinations thereof; and wherein the other plurality of refractory particles is selected from the group consisting of alumina, zirconia, zircon, mullite, titania, and combinations thereof.

11. The labeled cathode ray tube of claim 3, wherein said second softening temperature is from about 5° C. to about 50° C. higher than said first softening temperature.

* * * * *

UNITED STATES PATENT AND TRADEMARK OFFICE
CERTIFICATE OF CORRECTION

PATENT NO. : 6,455,998 B1
DATED : September 24, 2002
INVENTOR(S) : Moh, Kyung H.

It is certified that error appears in the above-identified patent and that said Letters Patent is hereby corrected as shown below:

Title page,
Item [57], ABSTRACT, "comprising" should be -- comprises --.
Item [62], "Division" should be -- Divisional --.

Column 1,
Line 10, "temperatures temperatures above" should be -- temperature (e.g., temperatures above --.

Column 2,
Line 17, insert -- of -- following "more".

Column 3,
Line 18, insert -- . -- following "thereof".
Line 36, insert -- . -- following "In".

Column 4,
Line 8, "hazard" should be -- hazards --.
Line 30, "," should be -- ; --.
Line 63, "DRAWING" should be -- DRAWINGS --.

Column 5,
Line 40, "label according to the present invention 10" should be
-- label 10 according to the present invention --.

Column 6,
Line 19, "curvatue" should be -- curvature --.

Column 7,
Line 29, "includes" should be -- include --.
Lines 58 and 59, "label according to the present invention 10A" should be
-- label 10A according to the present invention --.
Lines 66 and 67, "label according to the present invention 10B" should be
-- label 10B according to the present invention --.

Column 8,
Line 30, "pattern ed" should be -- patterned --.
Lines 49 and 50, "label according to the present invention 10C" should be
-- label 10C according to the present invention --.

UNITED STATES PATENT AND TRADEMARK OFFICE
CERTIFICATE OF CORRECTION

PATENT NO. : 6,455,998 B1
DATED : September 24, 2002
INVENTOR(S) : Moh, Kyung H.

It is certified that error appears in the above-identified patent and that said Letters Patent is hereby corrected as shown below:

Column 9,
Line 4, "cermets" should be -- cermet --.
Line 15, insert -- 14 -- following "layer".

Column 10,
Line 7, "Therno" should be -- Thermo --.
Line 35, "2" should be -- 2 --.
Line 42, "fiseably" should be -- fuseably --.
Line 58, "viscosity" should be -- viscosify --.
Line 62, "have" should be -- having --.

Column 12,
Line 4, insert -- from about -- preceding "10".
Line 9, "Coring" should be -- Corning --.
Line 36, "optical" should be -- optically --.
Line 49, "General" should be -- Generally --.

Column 13,
Line 12, insert -- penetrate -- following "also".
Lines 22 and 23, "a little ways" should be -- a little way --.
Line 56, delete "," following "a".

Column 14,
Line 51, "flit" should be -- frit --.

Column 17,
Line 6, "temrperatures" should be -- temperatures --.
Line 43, "WVVC" should be -- Wpc --.
Lines 60 and 61, "stationery" should be -- stationary --.

Column 18,
Line 25, delete "a" following "to".

Column 20,
Lines 33 and 66, insert -- the -- following "to".

UNITED STATES PATENT AND TRADEMARK OFFICE
CERTIFICATE OF CORRECTION

PATENT NO. : 6,455,998 B1
DATED : September 24, 2002
INVENTOR(S) : Moh, Kyung H.

It is certified that error appears in the above-identified patent and that said Letters Patent is hereby corrected as shown below:

Column 21,
Line 57, "mlxture" should be -- mixture --.

Column 22,
Line 12, insert -- the -- following "to".
Line 42, "company" should be -- Company --.
Line 43, "flit" should be -- frit --.

Column 23,
Lines 29 and 66, insert -- the -- following "through".

Column 24,
Line 35, insert -- C. -- following "400°".
Line 57, "flit" should be -- frit --.
Line 47, "$TiO_2$") should be $TiO_2$) --.

Column 26,
Line 8, insert -- the -- following "to".
Line 63, insert -- C. -- following "5°".

Column 27,
Line19, "." should be -- , --.
Line 58, "POLYEThLENE" should be -- POLYETHYLENE --.

Column 29,
Line 14, "fist" should be -- first --.

Signed and Sealed this

Third Day of August, 2004

JON W. DUDAS
*Acting Director of the United States Patent and Trademark Office*